US012793730B2

(12) United States Patent
Heo et al.

(10) Patent No.: US 12,793,730 B2
(45) Date of Patent: Nov. 10, 2026

(54) ELECTRONIC DEVICE AND MICROPHONE SIGNAL CORRECTION METHOD THEREOF

(71) Applicant: Samsung Electronics Co., Ltd., Suwon-si (KR)

(72) Inventors: Seungyoon Heo, Suwon-si (KR); Choonho Kim, Suwon-si (KR); Gangyoul Kim, Suwon-si (KR); Chaerim Bang, Suwon-si (KR); Sunghwa Woo, Suwon-si (KR); Sangsu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 18/585,616

(22) Filed: Feb. 23, 2024

(65) Prior Publication Data

US 2024/0265931 A1 Aug. 8, 2024

Related U.S. Application Data

(63) Continuation of application No. PCT/KR2024/001873, filed on Feb. 8, 2024.

(30) Foreign Application Priority Data

Feb. 8, 2023 (KR) ........................ 10-2023-0016826
Mar. 31, 2023 (KR) ........................ 10-2023-0043137

(51) Int. Cl.
*G10L 21/0364* (2013.01)
*G10L 21/0232* (2013.01)
(Continued)

(52) U.S. Cl.
CPC ...... *G10L 21/0232* (2013.01); *G10L 21/0364* (2013.01); *G10L 25/21* (2013.01);
(Continued)

(58) Field of Classification Search
None
See application file for complete search history.

(56) References Cited

U.S. PATENT DOCUMENTS 8,275,120 B2 9/2012 Stokes, III et al.
8,577,048 B2 11/2013 Chaikin
(Continued)

FOREIGN PATENT DOCUMENTS

JP 4778582 9/2011
JP 2016-092822 5/2016
(Continued)

OTHER PUBLICATIONS

Search Report and Written Opinion dated May 21, 2024 issued in International Patent Application No. PCT/KR2024/001873.

*Primary Examiner* — Pierre Louis Desir
*Assistant Examiner* — Kristen Michelle Masters
(74) *Attorney, Agent, or Firm* — Nixon & Vanderhye P.C.

(57) ABSTRACT

An electronic device according to various embodiments of the disclosure may include: a communication module, comprising communication circuitry, configured to perform wireless communication with a network, at least one microphone configured to collect a sound signal, at least one speaker configured to output the sound signal, and at least one processor, comprising processing circuitry, operatively connected to the at least one microphone and the at least one speaker. At least one processor, individually and/or collectively, may be configured to: perform a call connection with an external electronic device through a network using the communication module, process a first sound signal corresponding to a sound signal input from the external electronic device and received through the network, and output the processed first sound signal through the at least one speaker, detect the first sound signal output through the at least one speaker, through the microphone to generate a second sound
(Continued)

signal. At least one processor, individually and/or collectively, may compare an energy level of a frequency band equal to or below a reference frequency in the first sound signal with an energy level of a frequency band equal to or below the reference frequency in the second sound signal, and based on a result of the comparison, determine spatial information corresponding to a space in which the electronic device is located.

20 Claims, 16 Drawing Sheets

(51) Int. Cl.

| | |
|---|---|
| ***G10L 25/21*** | (2013.01) |
| ***G10L 25/51*** | (2013.01) |
| ***H04M 1/60*** | (2006.01) |
| ***H04M 9/00*** | (2006.01) |
| ***H04M 9/08*** | (2006.01) |
| ***H04R 3/02*** | (2006.01) |
| *G10L 21/0208* | (2013.01) |
| *G10L 21/0216* | (2013.01) |

(52) U.S. Cl.
CPC ........... *H04M 1/6008* (2013.01); *H04M 9/00* (2013.01); *G10L 2021/02082* (2013.01); *G10L 2021/02166* (2013.01)

(56) References Cited

U.S. PATENT DOCUMENTS

| | | | | |
|---|---|---|---|---|
| 10,244,121 | B2 | 3/2019 | Mani et al. | |
| 11,093,044 | B2 | 8/2021 | Tkaczuk et al. | |
| 11,197,093 | B2 | 12/2021 | Terashima | |
| 11,483,652 | B2 | 10/2022 | Ohashi | |
| 2018/0151187 | A1 | 5/2018 | Sorensen et al. | |
| 2019/0132674 | A1* | 5/2019 | Vilkamo | G10L 25/18 |
| 2023/0162739 | A1 | 5/2023 | Han | |
| 2023/0186936 | A1* | 6/2023 | Yang | G10L 25/84<br>704/207 |
| 2023/0353684 | A1 | 11/2023 | Kim | |

FOREIGN PATENT DOCUMENTS

| | | | |
|---|---|---|---|
| JP | 2016-111657 | | 6/2016 |
| JP | 2017175341 | A | 9/2017 |
| JP | 2019-004394 | | 1/2019 |
| JP | 2021-097292 | | 6/2021 |
| JP | 2021184587 | A | 12/2021 |
| JP | 7213432 | | 1/2023 |
| KR | 10-2018-0101937 | | 9/2018 |
| KR | 10-2019-0037885 | | 4/2019 |
| KR | 20210083872 | A | 7/2021 |
| KR | 20220102451 | A | 7/2022 |
| KR | 20220102492 | A | 7/2022 |
| KR | 20220111078 | A | 8/2022 |

* cited by examiner

ELECTRONIC DEVICE AND MICROPHONE SIGNAL CORRECTION METHOD THEREOF

CROSS-REFERENCE TO RELATED APPLICATIONS

This application is a continuation of International Application No. PCT/KR2024/001873 designating the United States, filed on Feb. 8, 2024, in the Korean Intellectual Property Receiving Office and claiming priority to Korean Patent Application Nos. 10-2023-0016826, filed on Feb. 8, 2023, and 10-2023-0043137, filed on Mar. 31, 2023, in the Korean Intellectual Property Office, the disclosures of each of which are incorporated by reference herein in their entireties.

BACKGROUND

Field

The disclosure relates to an electronic device, and a method for correcting a microphone signal by the electronic device.

Description of Related Art

A portable electronic device (hereinafter referred to as an electronic device) may provide a wireless communication function, and may provide a voice and/or video call function with an external electronic device (or a counterpart device) through a wireless communication network. For example, the electronic device may include a microphone that receives a user's voice and a speaker (or receiver) that outputs the other party's voice transmitted from an external electronic device. During a call, the user's voice and the other party's voice may be exchanged in real time and accordingly, the sound output through the speaker is input to the microphone and cause echoes. The electronic device may provide various signal processing techniques to cancel these echoes.

The electronic device may correct a sound signal input to a microphone by a user's utterance and transmit the corrected sound signal to an external electronic device. The correction operation may be, together with echo cancellation, used for canceling ambient noise to amplify and/or filter a sound signal corresponding to the user's voice.

While a user is making a call using an electronic device, the surrounding environment may change, and a method in which a user holds or places the electronic device may also vary. These environmental changes and use state changes may affect the characteristics of sound signals input to microphones. A conventional electronic device processes sound signals input through microphones using fixed parameters, and thus do not properly reflect changes in the surrounding environment and use state.

SUMMARY

An electronic device according to various example embodiments of the disclosure may include: a communication module, comprising communication circuitry, configured to perform wireless communication with a network, at least one microphone configured to collect a sound signal, at least one speaker configured to output a sound signal, and at least one processor, comprising processing circuitry, operatively connected to the at least one microphone and the at least one speaker.

According to an example embodiment, at least one processor, individually and/or collectively, may be configured to: perform a call connection with an external electronic device through a network, using the communication module, process a first sound signal corresponding to a sound signal input from the external electronic device and received through the network, and output the processed first sound signal through the at least one speaker, and detect the first sound signal, output through the at least one speaker, through the microphone to generate a second sound signal.

According to an example embodiment, at least one processor, individually and/or collectively, may be configured to: compare an energy level of a frequency band equal to or lower than a reference frequency in the first sound signal with an energy level of a frequency band equal to or lower than the reference frequency in the second sound signal, and determine spatial information corresponding to a space in which the electronic device is located, based on a result of the comparison.

According to an example embodiment, at least one processor, individually and/or collectively, may be configured to, based on the determined spatial information, determine at least one parameter for processing a third sound signal corresponding to a voice input through the microphone.

According to various example embodiments of the disclosure, it is possible to provide a microphone signal correction method of an electronic device, capable of determining a changing call environment in real time in an electronic device, and correcting a sound signal input to a microphone using appropriate parameters according to the call environment, so as to transmit a high-quality sound signal to an external electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
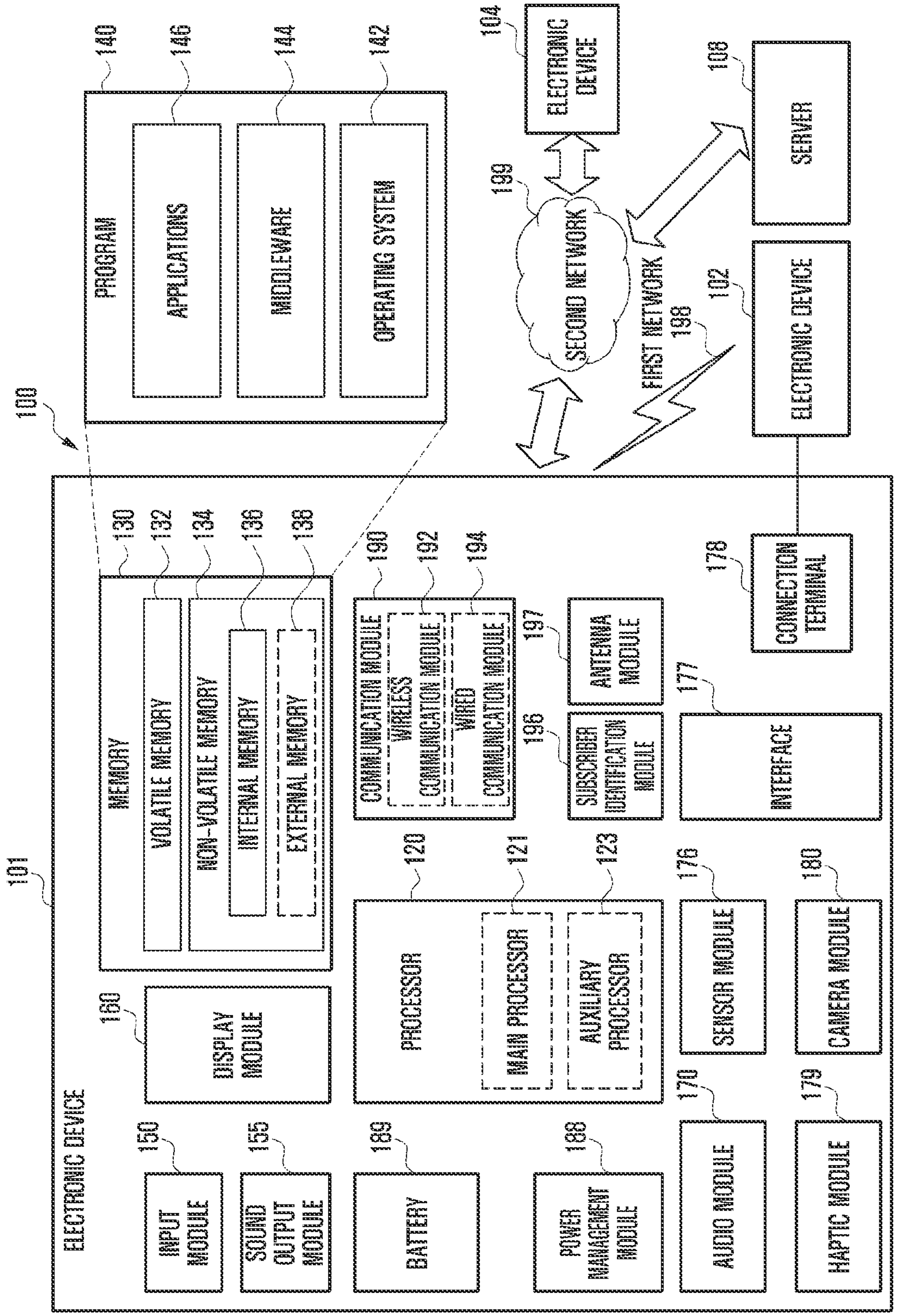
FIG. 1 is a block diagram illustrating an example electronic device in a network environment according to various embodiments.

Hereinafter, various example embodiments of the disclosure are described in greater detail with reference to the drawings. However, the disclosure may be implemented in many different forms and is not limited to the embodiments described herein. In relation to the description of the drawings, the same or similar reference numerals may be used for the same or similar elements. In addition, in the drawings and associated description, descriptions of well-known functions and configurations may be omitted for clarity and brevity.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
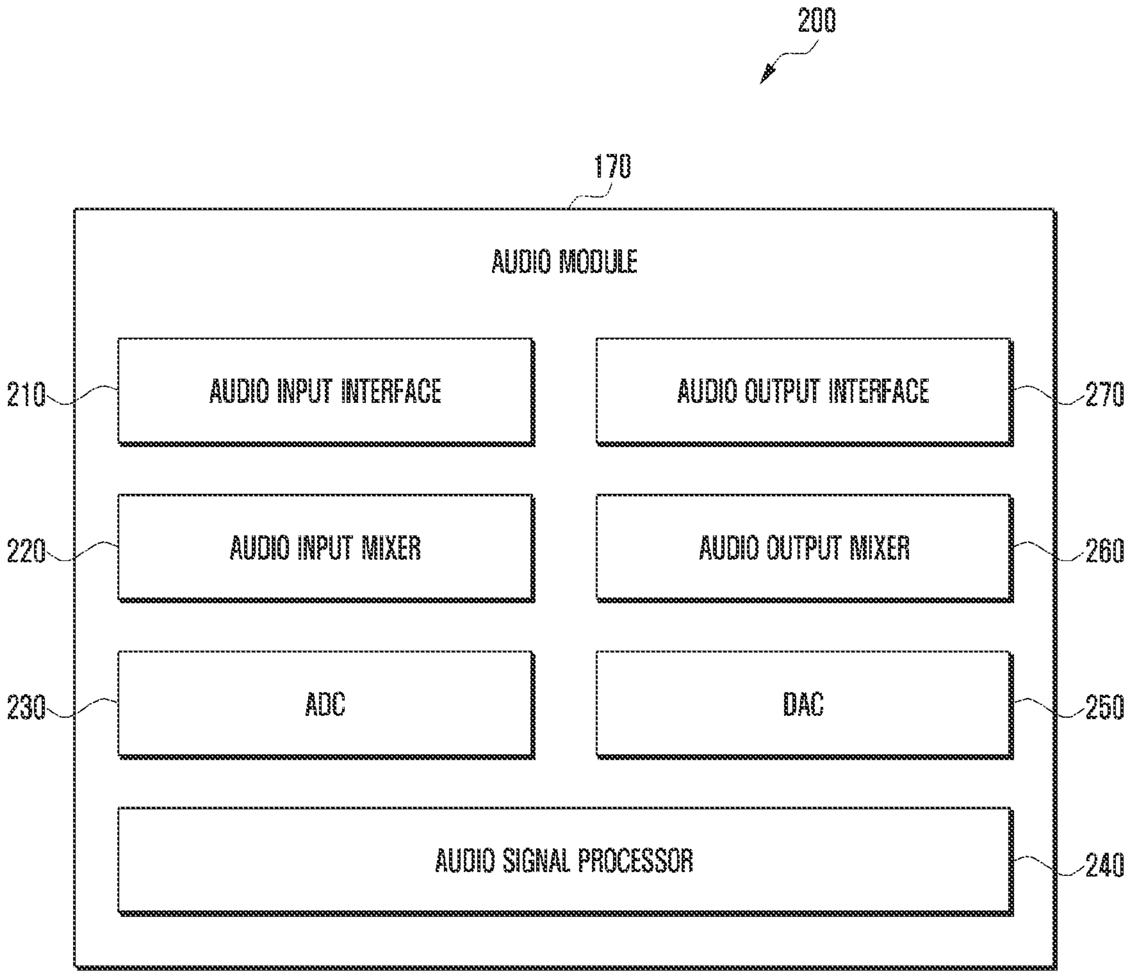
FIG. 2 is a block diagram illustrating an example configuration of an audio module according to various embodiments.

FIG. 2 is a block diagram illustrating an example configuration of an audio module according to various embodiments.

Referring to FIG. 2, an audio module 170 may include, for example, an audio input interface 210, an audio input mixer 220, an analog to digital converter (ADC) 230, and an audio signal processor (e.g., including various processing circuitry) 240, a digital to analog converter (DAC) 250, an audio output mixer 260, and/or an audio output interface 270. The various modules may include various circuitry (e.g., processing circuitry) and/or executable program instructions.

The audio input interface 210 may include various circuitry and receive audio signals corresponding to sounds acquired from the outside of the electronic device 101, through a microphone (e.g., a dynamic microphone, condenser microphone, or piezo microphone) configured either as part of the input device 150 or separately from the electronic device 101. For example, in a case of acquiring an audio signal from an external electronic device 102 (e.g., a headset or microphone), the audio input interface 210 may be connected to the external electronic device 102 in a wired manner via the connection terminal 178 or in a wireless manner via the wireless communication module 192 (e.g., via Bluetooth communication), so as to receive the audio signal. According to an embodiment, the audio input interface 210 may receive a control signal (e.g., a volume adjustment signal using an input button) related to the audio signal obtained from the external electronic device 102. The audio input interface 210 includes a plurality of audio input channels and may receive different audio signals for each audio input channel. According to an embodiment, additionally or alternatively, the audio input interface 210 may receive an audio signal from another component (e.g., the processor 120 or the memory 130) of the electronic device 101.

The audio input mixer 220 may include various circuitry and mix a plurality of input audio signals into at least one audio signal. According to an embodiment, the audio input mixer 220 may mix a plurality of analog audio signals input via the audio input interface 210 into at least one analog audio signal.

The ADC 230 may include various circuitry and convert analog audio signals into digital audio signals. According to an embodiment, the ADC 230 may convert an analog audio signal received via the audio input interface 210, or may additionally or alternatively convert an analog audio signal mixed via the audio input mixer 220 into a digital audio signal.

The audio signal processor 240 may include various processing circuitry and/or multiple processors. For example, as used herein, including the claims, the term “processor”, “audio signal processor”, or the like, may include various processing circuitry, including at least one processor, wherein one or more of at least one processor, individually and/or collectively in a distributed manner, may be configured to perform various functions described herein.

As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The audio signal processor 240 may perform various processing on a digital audio signal input through the ADC 230 or a digital audio signal received from another component of the electronic device 101. For example, the audio signal processor 240 may perform, for one or more digital audio signals, changing of a sampling rate, application of one or more filters, interpolation processing, amplification or attenuation processing (e.g., amplification or attenuation of some or all frequency bands), noise processing (e.g., noise or echo attenuation), channel changing (e.g., switching between mono and stereo), mixing, or designated signal extraction. According to an embodiment, at least some functions of the audio signal processor 240 may be implemented in the form of an equalizer.

The DAC 250 may include various circuitry and convert digital audio signals into analog audio signals. According to an embodiment, the DAC 250 may convert a digital audio signal processed by the audio signal processor 240 or a digital audio signal obtained from another component of the electronic device 101 into an analog audio signal The audio output mixer 260 may include various circuitry and mix a plurality of audio signals to be output into at least one audio signal. According to an embodiment, the audio output mixer 260 may mix audio signals converted to analog via the DAC 250 and other analog audio signals (e.g., analog audio signals received via the audio input interface 210) into at least one analog audio signal.

The audio output interface 270 may include various circuitry and output the analog audio signal converted via the DAC 250, or additionally or alternatively, the analog audio signal mixed by the audio output mixer 260, to the outside of the electronic device 101 via the sound output device 155 (e.g., a speaker (e.g., a dynamic driver or balanced armature driver), or a receiver). According to an embodiment, the sound output device 155 may include a plurality of speakers, and the audio output interface 270 may output an audio signal having a plurality of different channels (e.g., stereo, or 5.1 channels) through at least some of the plurality of speakers. According to an embodiment, the audio output interface 270 may be connected to the external electronic device 102 (e.g., an external speaker or headset) in a wired manner via the connection terminal 178, or in a wireless manner via the wireless communication module 192, so as to output an audio signal.

According to an embodiment, the audio module 170 may not separately include an audio input mixer 220 or an audio output mixer 260, but may mix a plurality of digital audio signals using at least some functions of the audio signal processor 240 to generate at least one digital audio signal.

According to an embodiment, the audio module 170 may include an audio amplifier (not shown) (e.g., a speaker amplification circuit) capable of amplifying an analog audio signal input via the audio input interface 210, or an audio signal to be output via the audio output interface 270. According to an embodiment, the audio amplifier may be configured as a separate module from the audio module 170.

Figure 3:
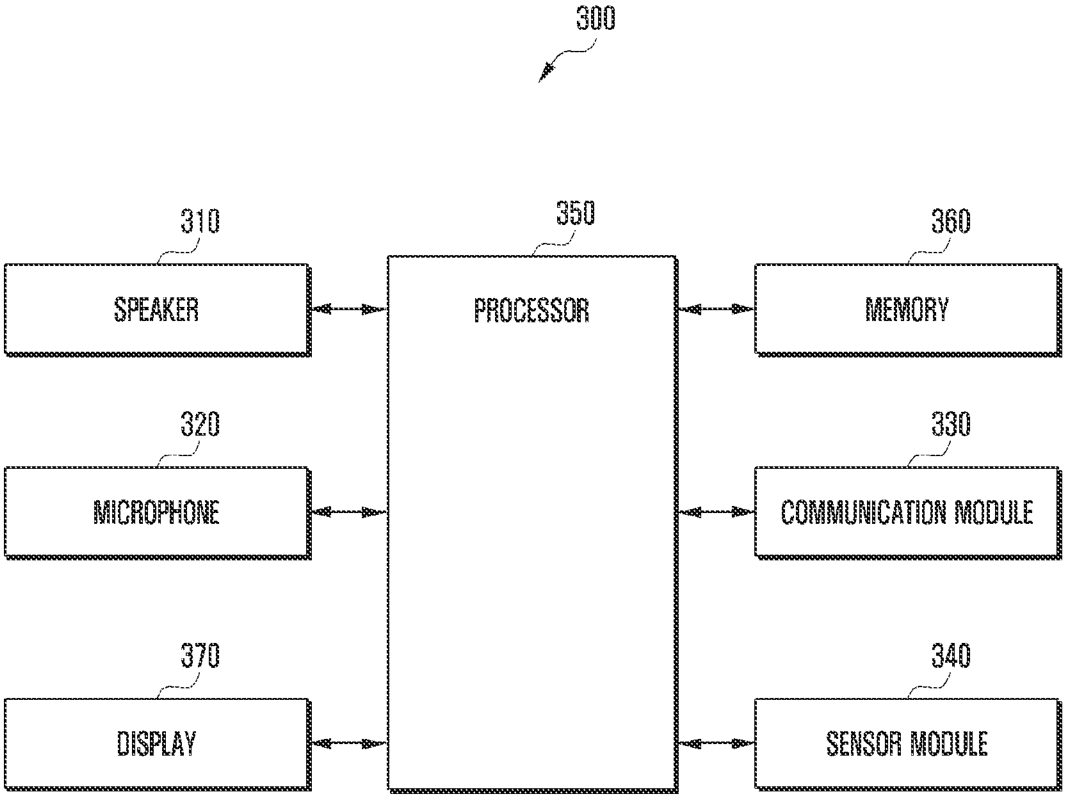
FIG. 3 is a block diagram illustrating an example configuration of an electronic device according to various embodiments.

FIG. 3 is a block diagram illustrating an example configuration of an electronic device according to various embodiments.

Referring to FIG. 3, the electronic device 300 according to an embodiment may include a speaker 310, a microphone 320, a display 370, a communication module (e.g., including communication circuitry) 330, a sensor module (e.g., including at least one sensor) 340, a processor (e.g., including processing circuitry) 350, and a memory 360, and various embodiments of the disclosure may be implemented even if some of the illustrated configurations are omitted or replaced with other configurations. Although each of the speaker 310 and the microphone 320 is shown as one block in FIG. 3, the electronic device 300 may include at least one speaker and/or at least one microphone.

In addition to the configurations shown, the electronic device 300 may further include at least some of the configurations and/or functions of the electronic device 101 of FIG. 1 and the configurations and/or functions of the audio module 170 of FIG. 2. At least some of each of the configurations shown (or not shown) of the electronic device 300 may be operatively, functionally, and/or electrically connected to each other.

According to an embodiment, the display 370 may be implemented as one of, but not limited to, a liquid crystal display (LCD), a light-emitting diode (LED) display, or an organic light-emitting diode (OLED) display. The display 370 may be configured as a touch screen that detects touch and/or proximity touch (or hovering) input using a part of a user's body (e.g., a finger) or input device (e.g., a stylus pen). The display 370 may include at least some of the configurations and/or functions of the display module 160 of FIG. 1. The display 370 may be at least partially flexible and may be implemented as a foldable display or rollable display. The display 370 may include at least some of the configurations and/or functions of the display module 160 of FIG. 1.

According to an embodiment, the communication module 330 may include various communication circuitry and support various wireless communication functions. For example, the communication module 330 may include circuitry support establishing a communication channel with an external device or network and performing communication through the established communication channel. The communication module 330 may include a short-range wireless communication module supporting short-range wireless communication (e.g., Wi-Fi) and a cellular wireless communication module supporting cellular wireless communication (e.g., 4G LTE, 5G NR). The wireless communication method supported by the communication module 330 is not limited to the examples disclosed in the disclosure. When a call connection with an external electronic device (or the other party's device) is requested by a user's input, or a call connection request is received by the external electronic device, the communication module 330 may establish a call connection with the external electronic device through the network, transmit sound signals input through the microphone 320 and processed by the processor 350 to the external electronic device through the network, and receive sound signals input from the external electronic device and received through the network and provide the sound signals to the processor 350. The communication module 330 may include at least some of the configurations and/or functions of the communication module 190 of FIG. 1.

According to an embodiment, the sensor module 340 may include at least one sensor that senses various data related to the state of the electronic device 300. For example, the sensor module 340 may include an acceleration sensor and a gyro sensor to detect the movement state of the electronic device 300. The types of sensors and/or sensed data included in the sensor module 340 are not limited to this, and may further include various types of sensors such as, gesture sensors, barometric pressure sensors, magnetic sensors, grip sensors, proximity sensors, color sensors, infrared (IR) sensors, biometric sensors, temperature sensors, humidity sensors, or illuminance sensors. The sensor module 340 may include at least some of the configurations and/or functions of the sensor module 176 of FIG. 1.

According to an embodiment, the electronic device 300 may include at least one speaker 310 that outputs a sound signal. The speaker 310 may amplify the sound signal provided by the processor 350 and output the amplified sound signal to the outside. The speaker 310 may be at least partially exposed to the outside in order to output sound to the outside. The arrangement structure of at least one speaker 310 included in the electronic device 300 will be described in more detail with reference to FIG. 4.

According to an embodiment, the electronic device 300 may include at least one microphone 320 that collects external sounds. The microphone 320 may collect analog sounds, convert the analog sounds into sound signals that are digital signals, and provide the digital sounds to the processor 350. The electronic device 300 may be at least partially exposed to the outside in order to collect external sounds. The electronic device 300 may include at least one microphone, and sound signals acquired by each of the microphones 320 may be multiplexed through each of the channels or through one channel and provided to the processor 350. The arrangement structure of at least one microphone 320 included in the electronic device 300 will be described in more detail with reference to FIG. 4.

According to an embodiment, the memory 360 may include a volatile memory and a non-volatile memory and temporarily or permanently store various data. The memory 360 includes at least some of the configurations and/or functions of the memory 130 of FIG. 1, and may store the program 140 of FIG. 1.

According to an embodiment, the memory 360 may store various instructions that may be performed by the processor 350. These instructions may include control instructions such as arithmetic and logical operations, data movement, and input/output that may be recognized by the processor 350.

According to an embodiment, the processor 350 is a component capable of performing data processing or computations related to control and/or communication of each component of the electronic device 300, and may be configured by one or more processors. The processor 350 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 350 may include at least some of the components and/or functions of the processor 120 of FIG. 1.

According to an embodiment, there is no limitation to the computations and data processing functions that the processor 350 may implement on the electronic device 300, but the disclosure will describe various embodiments in which sound signals input from each of the microphones 320 and/or sound signals received from external electronic devices are compared and analyzed to determine a current spatial state in which the electronic device 300 is located and/or a use state (e.g., held or mounted) of the electronic device 300, and based on the determined spatial state and/or use state, parameters to be used in processing sound signals corresponding to a user's voice input through the microphone 320 are determined. The operations of processor 350 to be described below may be performed by loading instructions stored in the memory 360.

According to an embodiment, the processor 350 may establish a call (e.g., voice call or video call) connection with an external electronic device. The processor 350 may operate in a speaker phone mode based on the user's input and, when the speaker phone mode is activated, may output sound signals, which is received from an external electronic device, through the at least one speaker 310.

According to an embodiment, when a call connection is established with an external electronic device, the processor 350 may receive a sound signal, which is received from the external electronic device through the network, using the communication module 330, process the received sound signal, and output the same through the speaker 310. Hereinafter, the sound signal received from the external electronic device and output through the speaker 310 may be referred to as a reference signal or a first sound signal. Additionally, when a call connection is established with an external electronic device, the processor 350 may activate the microphone 320 to collect surrounding sounds including the user's voice, and obtain them as electrical signals. The processor 350 may process the acquired sound signal and transmit the processed sound signal to the external electronic device through the network using the communication module 330. Hereinafter, the sound signal detected by the microphone 320 during a call may be referred to as a third sound signal.

According to an embodiment, when the electronic device 300 outputs the first sound signal received from the external electronic device through the speaker 310, an echo phenomenon may occur in which the output sound is input to the microphone 320 and accordingly transmitted back to the external electronic device. Hereinafter, when the first sound signal is output from the speaker 310 and detected by the microphone 320, a detected echo component may be referred to as an echo signal or a second sound signal. According to an embodiment, the processor 350 may generate, as a second sound signal, a sound acquired through the microphone 320 while the user is not speaking.

According to an embodiment, the processor 350 may determine, based on the first sound signal (or reference signal) received from the external electronic device through the communication module 330 and the second sound signal (or echo signal) acquired through the microphone 320, parameters to be used in processing the third sound signal including the user's voice.

According to an embodiment, the processor 350 may obtain, based on the first sound signal and the second sound signal, spatial information of a space in which the electronic device 300 is currently located. The processor 350 may compare an energy level of a frequency band equal to or lower than a reference frequency in the first sound signal with an energy level of a frequency band equal to or lower than the reference frequency in the second sound signal, and based on the comparison, may determine spatial information corresponding to the space in which the electronic device 300 is located. Here, the reference frequency may be 250 Hz, but is not limited thereto.

The characteristics of the sound signal obtained by the microphone 320 may differ depending on the characteristics of the space in which the electronic device 300 is located, the pattern of which may be evident in a low frequency band. For example, a sound signal acquired in an anechoic chamber where the impact of echoes is low may have relatively low energy levels in a low frequency band, while a sound signal acquired on a staircase where the impact of echo is high may have relatively high energy levels in a low frequency band. In a high frequency band, unlike a low frequency band, an energy level of a signal may not have a predetermined pattern depending on a spatial environment. Accordingly, the processor 350 may compare the energy levels of the first sound signal and the second sound signal in a low frequency band equal to or lower than the reference frequency (e.g., 250 Hz), and if the difference is large, may determine that the electronic device 300 is located in a space in which the impact of echo is high (e.g., staircase).

According to an embodiment, the electronic device 300 may determine the spatial state of the electronic device 300, further based on the average energy level of all frequency bands of echo signals detected by each microphone 320. Here, the average energy level may be a root mean square (RMS) average level. For example, the electronic device 300 may determine an environment in which the larger the energy level in a low frequency band and the average energy level of all frequency bands in an environment, the greater the echoes.

According to an embodiment, the processor 350 may obtain information on the current use state of the electronic device 300 based on the difference between the first sound signal and the second sound signal. Here, the use state information may include information about whether the user is holding the electronic device 300 in hand or whether the electronic device 300 is mounted on the floor. When the user is holding the electronic device 300 in hand, the speaker 310 and/or microphone 320 are at least partially exposed to the outside and neighboring objects do not affect the output and detection of sound, whereas when the electronic device 300 is mounted on the floor, a specific microphone 320 may be blocked by the floor or the output sound may be reflected by the floor, which may result in changing the characteristics of the sound signal detected by the specific microphone 320.

According to an embodiment, the processor 350 may identify an average energy level of all frequency bands of the first sound signal and an average energy level of all frequency bands of the second sound signal, and based on the identification, may determine the use state of the electronic device 300.

According to an embodiment, the memory 360 may store a correction table in which an energy level of a signal is mapped to spatial information and/or use state information. For example, the correction table may map and store, for each microphone 320, a delta value corresponding to a difference between an average energy level of all frequency bands of the first sound signal and an average energy level of all frequency bands of the second sound signal, in a state in which spatial information and use state information have been applied. The delta value stored in the correction table may be determined based on the results of experiments in various spatial environments in advance. For example, while a user is holding the electronic device 300, a delta value, which is a difference between an energy level of all frequency bands of signals measured by the first, second, and third microphones at each location and an energy level of all frequency bands of signals output through the speaker 310 may be measured as illustrated in Table 1 below. In Tables 1 and 2 below, "default" is an environment in which there is no impact of echo, and the echo impact may be greater in order of following environments: listening room-phone booth-office-conference room-staircase-hallway.

TABLE 1

| | Default | Listening room | Phone booth | Office | Conference room | Staircase | Hallway |
|---|---|---|---|---|---|---|---|
| MIC 1 | −21.81 | −21.75 | −21.20 | −20.98 | −20.90 | −20.63 | −20.22 |
| MIC 2 | −23.50 | −23.48 | −23.30 | −23.20 | −23.01 | −22.96 | −21.56 |
| MIC 3 | −29.36 | −28.84 | −27.93 | −27.87 | −27.26 | −26.34 | −25.44 |

In addition, while the user places the electronic device 300 on the floor, a delta value, which is the difference between an energy level of all frequency bands of signals measured by the first, second, and third microphones at each location and an energy level of all frequency bands of signals output through the speaker 310, may be measured as illustrated in Table 2 below.

TABLE 2

| | Default | Listening room | Phone booth | Office | Conference room | Staircase | Hallway |
|---|---|---|---|---|---|---|---|
| MIC 1 | −18.97 | −18.75 | −18.74 | −18.69 | −18.58 | −18.30 | −18.27 |
| MIC 2 | −19.43 | −19.39 | −19.37 | −19.01 | −18.96 | −18.75 | −18.28 |
| MIC 3 | −23.77 | −22.25 | −22.11 | −19.32 | −19.28 | −17.02 | −16.97 |

According to an embodiment, the processor 350 may analyze the first sound signal obtained during a call and the second sound signal obtained by each microphone 320, calculate a delta value corresponding to the difference between average energy levels thereof, and identify the spatial information and use state information mapped to the delta value in the correction table (e.g., Table 1, Table 2) stored in the memory 360.

According to an embodiment, the correction table stored in the memory 360 may include parameters mapped to each spatial information and use state information. Here, the parameters may include various parameters used in the processing of the third sound signal (or user voice signal), for example, a filter value to be applied to a filter for filtering the third sound signal and/or a gain to be applied to an amplifier that amplifies the third sound signal. The types of parameters described above are examples, and various parameters used in processing sound signals may be mapped and stored in a correction table.

According to an embodiment, the processor 350 may determine parameters to be used in processing the third sound signal (or a user voice signal), based on the determined spatial information and/or use state information. After determining the spatial information and use state information and determining the parameters, the processor 350 may, when a third sound signal (or a user voice signal) by a user utterance is detected by the microphone 320, process the third sound signal corresponding to the user's voice using the determined parameters. Accordingly, the electronic device 300 may use a parameter that is most correlated with the user's voice signal.

According to an embodiment, the processor 350 may perform echo cancellation of the third sound signal based on the first sound signal. Here, the echo cancellation operation may be independent of the processing operation (e.g., filtering, amplification) of the third sound signal. According to an embodiment, the processor 350 may process the third sound signal from which the echo component has been cancelled, using the determined parameters. The processor 350 may transmit the third sound signal processed as described above to an external electronic device through the network, using the communication module 330.

According to an embodiment, the processor 350 may process the third sound signal acquired by each of the microphones 320 and compare the third signal before and after correction, and when the sound signal of a specific microphone 320 is too low relative to the second sound signal, the processor 350 may determine that the microphone 320 has an anomaly. The processor 350 may determine that an anomaly has occurred in the specific microphone 320 in case that the result of correcting the third sound signal according to the parameters mapped to the spatial information and the use state information has a large difference from the pre-stored default signal. In case an abnormality occurs in the microphone 320, the processor 350 may notify the user of the abnormality in the microphone 320 through a visual notification via the display 370 or a sound effect via the speaker 310.

Figures 4A, 4B:
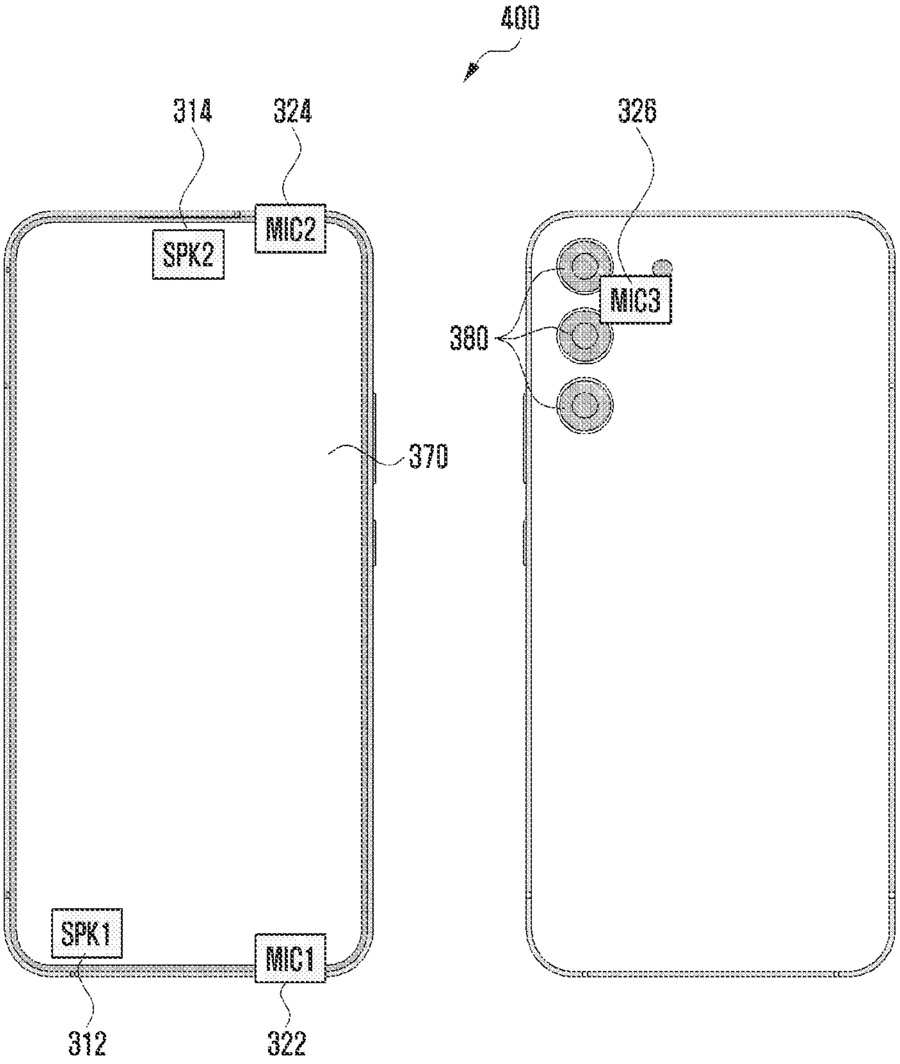
FIGS. 4A and 4B are diagrams illustrating an example layout structure of a microphone and a speaker of an electronic device according to various embodiments.

FIGS. 4A and 4B are diagrams illustrating an example layout structure of a microphone and a speaker of an electronic device according to various embodiments.

FIG. 4A illustrates the front side of an electronic device 400 (e.g., the electronic device 300 of FIG. 3) where the display 370 is disposed, and FIG. 4B illustrates the rear side of the electronic device. FIGS. 4A and 4B may correspond to an example of the shape of the electronic device 400, and various embodiments of the disclosure are not limited thereto. In FIGS. 4A and 4B, the electronic device 400 is shown as including two speakers 312 and 314 and three microphones 322, 324, and 326, but the number and/or arrangement position is not limited thereto.

According to an embodiment, the electronic device 400 may include at least one microphone 322, 324, and 326 (e.g., the microphone 320 of FIG. 3) and at least one speaker 312, 314 (e.g., the speaker 310 of FIG. 3). Referring to FIG. 4A, the first speaker 312 may be placed on the bottom side of the electronic device 400, and the second speaker 314 may be placed on the top side of the electronic device 400. Additionally, the first microphone 322 may be placed on the bottom side of the electronic device 400, and the second microphone 324 may be placed on the top side of the electronic device 400. Referring to FIG. 4B, the third microphone 326 may be placed adjacent to the camera 380 on the rear side of the electronic device 400.

According to an embodiment, each of microphones 322, 324, and 326 may communicate with the outside through an opening to collect external sounds. Each of speaker 312 and 314 may communicate with the outside through an opening to output sound to the outside.

According to an embodiment, the electronic device 400 may operate in a speaker phone mode during a voice or video call with an external electronic device, and in the speaker phone mode, the electronic device 400 may output a sound signal received from an external electronic device, using at least one of the first speaker 312 or the second speakers 314.

According to an embodiment, sounds output from the first speaker 312 and/or the second speaker 314 may be detected by each of the microphone 322, 324, and 326. In this case, a specific microphone disposed adjacent to a specific speaker may detect the sound of the corresponding speaker more loudly. For example, the first microphone 322 is disposed adjacent to the first speaker 312, and thus the sound signal output from the first speaker 312 may be detected louder than the sound signal output from the second speaker 314. Further, the second microphone 324 is disposed adjacent to the second speaker 314, and thus the sound signal output from the second speaker 314 may be detected louder than the sound signal output from the first speaker 312. Additionally, since the third microphone 326 is disposed at the rear side of the electronic device 400, signals output through the speaker may be detected smaller than those of the first microphone 322 and second microphone 324.

According to an embodiment, the electronic device 400 may store a correction table in which a parameter to be applied and a delta value based on the spatial state and/or use state of the electronic device 400 are mapped to each of the microphones 322, 324, 326. Here, the delta value may correspond to a difference of energy levels between a reference signal (or first sound signal) received from an external electronic device and an echo signal (or second sound signal) acquired by the microphone.

According to an embodiment, the electronic device 400 may determine parameters to be used for processing a user voice signal (or a third sound signal) input to the microphones 322, 324, and 326 by the user's utterance, using a correction table stored corresponding to each of the microphones 322, 324, and 326, and may correct the user voice signal acquired by each of the microphone 322, 324, and 326, using the determined parameters.

As shown in FIGS. 4A and 4B, since the impact of the sound output through the speakers 312 and 314 detected by each microphone 322, 324, and 326 is different, a correction table may be defined for each microphone and thus correction parameters that are close to the actual environmental characteristics can be applied.

Figure 5:
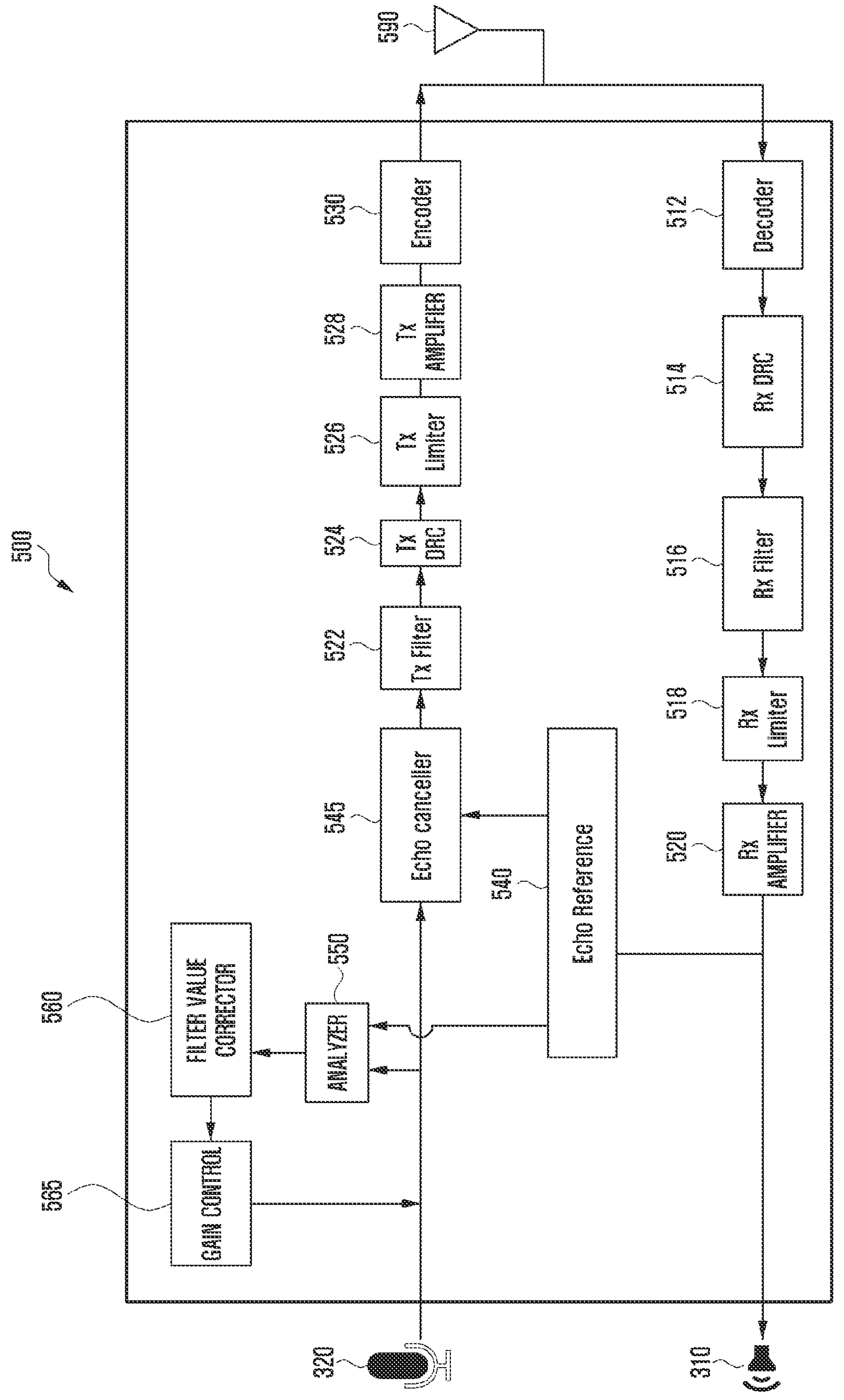
FIG. 5 is a block diagram illustrating an example configuration of a call sound processing module that processes transmission and reception call sounds of an electronic device according to various embodiments.

FIG. 5 is a block diagram illustrating an example configuration of a call sound processing module that processes transmission and reception call sounds of an electronic device according to various embodiments.

A sound processing module 500 shown in FIG. 5 and each block included in the sound processing module 500 may include various circuitry and/or software modules including various executable program instructions that may be executed on a processor (e.g., the processor 350 in FIG. 3), and/or at least a part thereof may be configured by separate hardware modules including various circuitry.

According to an embodiment, a first sound signal obtained from an external electronic device may be received by the antenna 590 of the electronic device 500 through a network. A decoder 512 may decode the first sound signal received through the antenna 590.

According to an embodiment, an Rx dynamic range compression (DRC) 514 may limit the size of the input first sound signal based on the dynamic range of the speaker 310. For example, the DRC may increase the level of the first sound signal in case that the level of the decoded first sound signal is less than a minimum threshold, and may decrease the level of the first sound signal in case that the level of the decoded first sound signal is greater than a maximum threshold.

According to an embodiment, the Rx filter 516 may filter signals in frequency bands that are audible to the user from the signal transferred from the Rx DRC 514. For example, the Rx filter 516 may include various filters used in the processing of sound signals, such as a high pass filter (HFP), a finite impulse response filter (FIR), an infinite impulse response filter (IIR), and a band pass filter (BPF).

According to an embodiment, the Rx limiter 518 may limit the peak level of the first sound signal transferred from the Rx filter 516. The Rx amplifier 520 may amplify the first sound signal according to a specified gain, and may output the amplified first sound signal to the speaker 310. The first sound signal output from the Rx amplifier 520 is transferred to an echo reference block 540, and the echo reference block 540 may transfer the first sound signal as a reference signal to an echo canceller 545 and analyzer 550.

According to an embodiment, the microphone 320 may collect the first sound signal output from the speaker 310 and generate a second sound signal.

According to an embodiment, the analyzer 550 may receive the first sound signal from the echo reference block 540 and a second sound signal from the microphone 320. The analyzer 550 may compare the first sound signal and the second sound signal to determine parameters to be used in processing a third sound signal including a user's voice. According to an embodiment, the analyzer 550 may compare an energy level of a frequency band equal to or lower than a reference frequency in the first sound signal with an energy level of a frequency band equal to or lower than the reference frequency in the second sound signal, and based on the comparison, may determine spatial information corresponding to a space in which the electronic device 500 is located. In addition, the analyzer 550 may identify an average energy level of all frequency bands of the first sound signal and an average energy level of all frequency bands of the second sound signal, and determine the use state of the electronic device 500 based on the identified average energy level. The analyzer may identify, in a correction table stored corresponding to each microphone 320, spatial information and use state information corresponding to the difference (or delta value) between the identified average energy levels, and may determine parameters mapped to the identified information. Here, the parameters may include various parameters used in processing the third sound signal (or user voice signal), for example, a filter value to be applied to a Tx filter 522 for filtering the third sound signal and/or a gain to be applied to a Tx amplifier 528 for amplifying the third sound signal.

According to an embodiment, the filter value corrector 560 may correct a filter value to be applied to the Tx filter 522, based on a filter value obtained by the analyzer 550. A gain controller 565 may correct a gain to be applied when the Tx amplifier 528 amplifies a sound signal, based on a gain value obtained by the analyzer 550.

According to an embodiment, the microphone 320 may generate a third sound signal (or a user voice signal) by collecting surrounding sounds including a user's voice.

According to an embodiment, the echo canceller 545 may subtract an echo signal, which is transferred from the echo reference block 540, from the third sound signal transferred by the microphone 320, thereby canceling an echo component that is output from the speaker 310 and input to the microphone 320. For example, the echo canceler 545 may further cancel a residual echo using a residual echo suppression module after performing filtering using a linear adaptive filter. The method by which the echo canceler 545 cancels the echo component from the third sound signal may be various.

According to an embodiment, the Tx filter 522 may filter signals in frequency bands that are audible to the user from the second sound signal, from which the echo component has been cancelled, transferred from the echo canceller 545. The Tx filter 522 may filter signals using a filter value corrected by the filter value corrector 560. The Tx filter 522 may include various filters used in the processing of sound signals, such as a high pass filter (HFP), a finite impulse response filter (FIR), an infinite impulse response filter (IIR), and a band pass filter (BPF).

According to an embodiment, the Tx DRC 524 may limit the size of the third sound signal based on the dynamic range of the external electronic device. The Tx limiter 526 may limit the peak level of the third sound signal transmitted from the Tx DRC 524.

According to an embodiment, the Tx amplifier 528 may amplify the third sound signal, and may output the amplified third sound signal to the encoder 530. The gain controlled in the gain controller 565 may be applied to the Tx amplifier 528. The encoder 530 may encode the transferred third sound signal and transmit the same to an external electronic device through the antenna 590.

Figure 6:
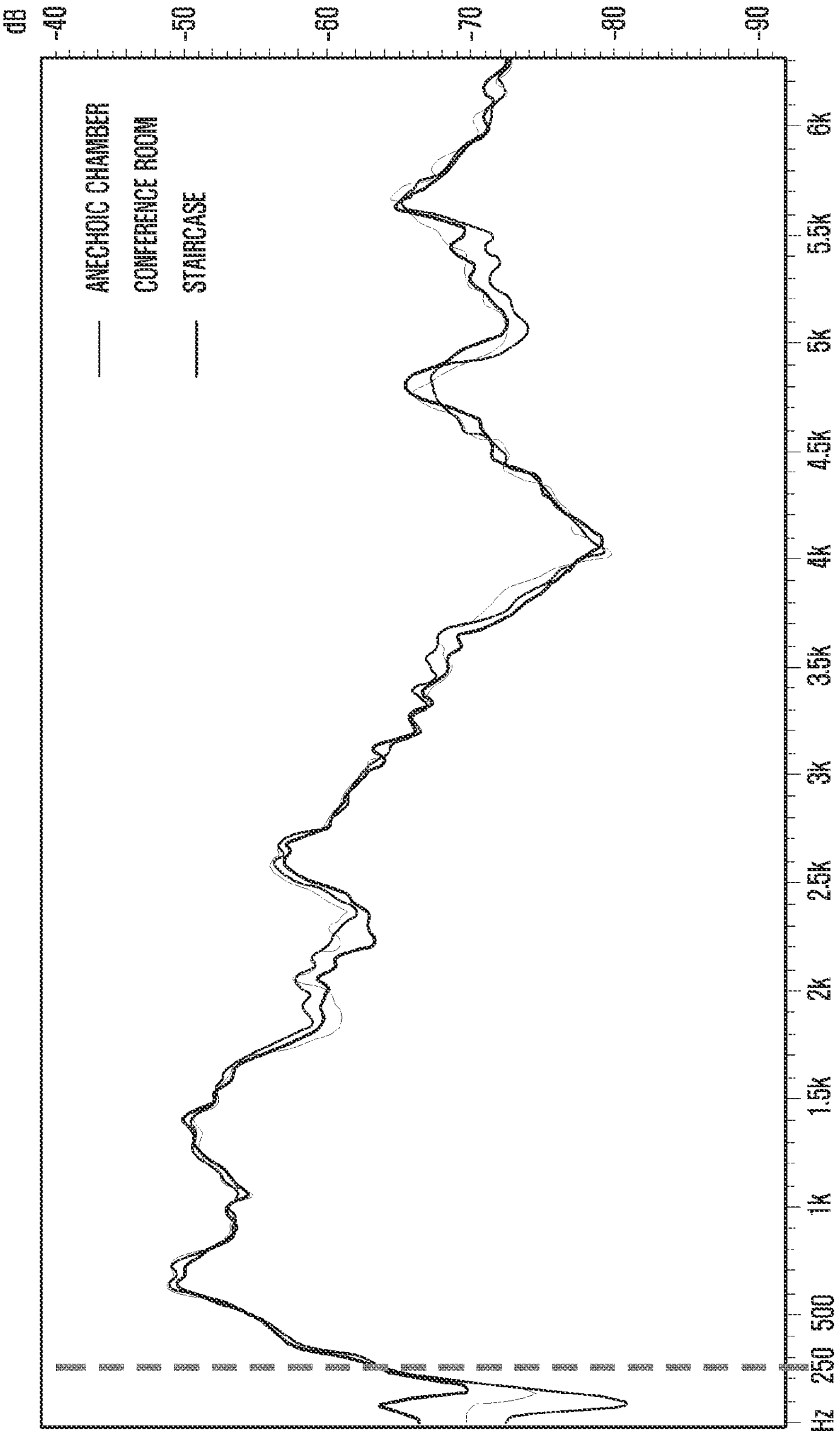
FIG. 6 is a graph illustrating an energy level for each frequency band of a signal acquired by a microphone of an electronic device according to various embodiments.

FIG. 6 is a graph illustrating an energy level for each frequency band of a signal acquired by a microphone of an electronic device according to various embodiments.

FIG. 6 illustrates an energy level for each frequency band of a signal detected by a specific microphone (e.g., the first microphone 322, the second microphone 324, or the third microphone 326 of FIG. 4) when the same reference signal (or a first sound signal) is output through speakers (e.g., the first speaker 312 and second speaker 314 of FIG. 4) in three different spatial environments (e.g., an anechoic chamber, a conference room, and a staircase). In FIG. 6, the x-axis represents a frequency band (Hz unit) and the y-axis represents an energy level of a signal (dB unit).

Referring to a graph of each signal shown in FIG. 6, a difference of an energy level of each signal may be large depending on a spatial state in a low frequency band. In relation to the change of an actual sound signal which is output from the speaker of the electronic device and detected by each microphone, the frequency response characteristics of a low frequency band of 250 Hz or below may differ greatly depending on the state of a space in which the electronic device is located, when compared with variance of energy levels of all frequency bands. For example, in relation to signals in a low frequency band of 250 Hz or below, an anechoic chamber may have a relatively low energy level due to significant signal attenuation, a staircase in which a lot of echo occurs may have a relatively high energy level due to signal boosting, and in a conference room, a medium energy level between the anechoic chamber and the staircase may be measured. On the other hand, in frequency bands higher than 250 Hz, the difference between energy levels of signals measured in the anechoic chamber, the conference room, and the staircase may be irregular. As such, when analyzing signals in a low frequency band of 250 Hz or below, the energy level of the signal exhibits a consistent shape depending on a spatial state, which facilitates the detection of the spatial state and it is relatively free in terms of frequency interference or attenuation due to the shape of the electronic device or speaker/microphone placement structure, and the measurement conditions.

According to an embodiment, an electronic device may detect a first sound signal (or a reference signal), which is output through a speaker, through a microphone to generate a second sound signal (or an echo signal), compare an energy level of a frequency band equal to or lower than a reference frequency (e.g., 250 Hz) in the first sound signal with an energy level of a frequency band equal to or lower than the reference frequency in the second sound signal, and based on a result of the comparison, determine spatial information corresponding to a space in which the electronic device is located.

FIGS. 7A, 7B, 7C, 7D, 7E and 7F are graphs illustrating energy levels for each frequency band of signals acquired by a microphone of an electronic device according to various embodiments.

In FIGS. 7A, 7B, 7C, 7D, 7E and 7F (which may be referred to herein as FIGS. 7A to 7F), the x-axis represents a frequency band (Hz unit), and the y-axis represents an energy level of a signal (dB unit). The graphs of FIGS. 7A to 7F illustrate a case in which a second speaker (e.g., the second speaker 314 of FIG. 4) disposed on top of an electronic device (e.g., the electronic device 300 of FIG. 3 and the electronic device 400 of FIG. 4) outputs a reference signal, a first microphone (e.g., the first microphone 322 of FIG. 4) may be placed relatively far from the second speaker, a second microphone (e.g., the second microphone 324 of FIG. 4) may be placed relatively close to the second speaker, and a third microphone (e.g., the third microphone 326 in FIG. 4) may be placed on the opposite side of the first and second microphones.

Figure 7A:
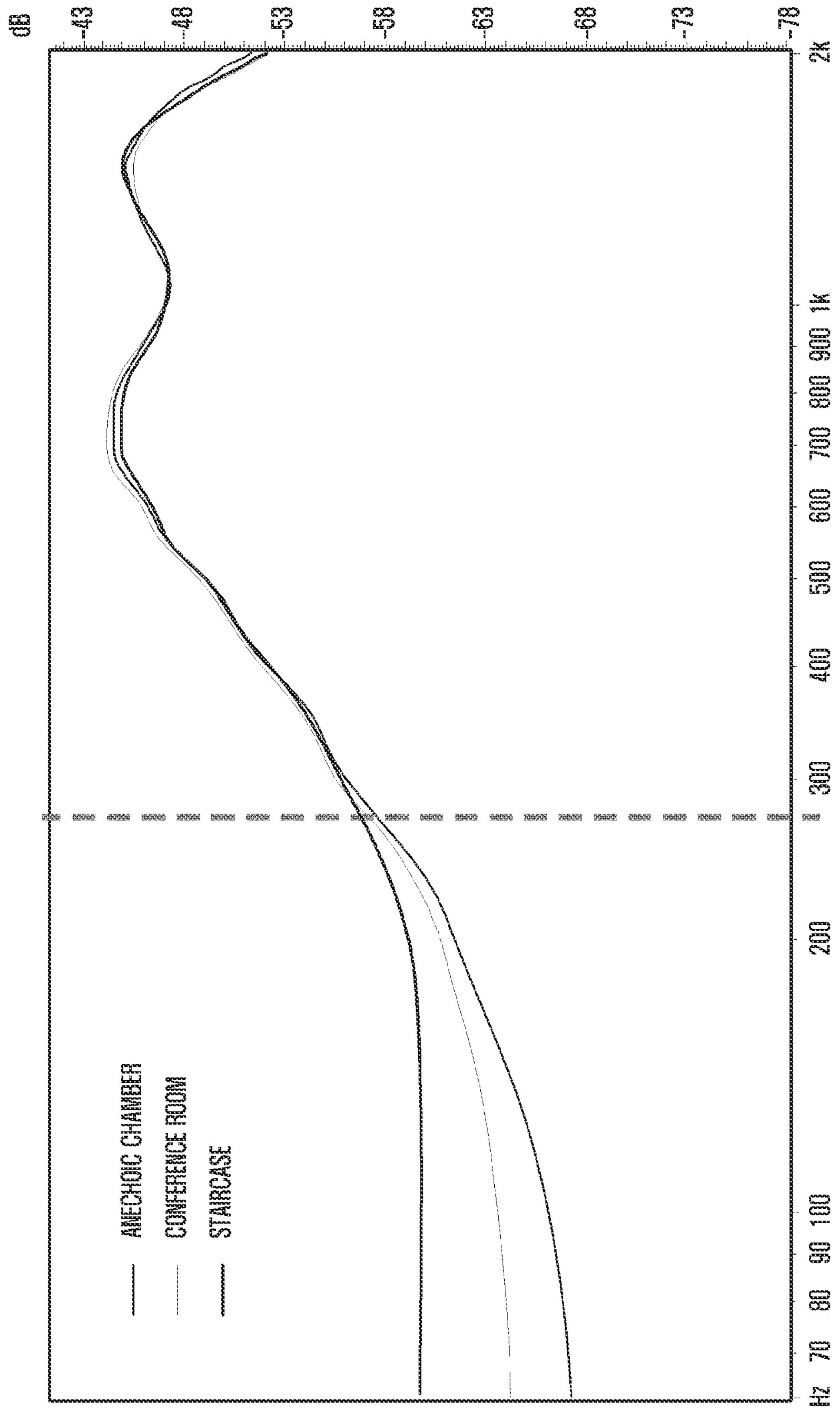
FIGS. 7A, 7B, 7C, 7D, 7E and 7F are graphs illustrating energy levels for each frequency band of signals acquired by a microphone of an electronic device according to various embodiments.

FIG. 7A illustrates an energy level for each frequency band of a signal detected by the first microphone of the electronic device when the same reference signal (or the first sound signal) is output through speakers (e.g., the first speaker 312 and second speaker 314 of FIG. 4) in three different spatial environments (e.g., an anechoic chamber, a conference room, and a staircase), in a state in which a user is holding the electronic device in hand.

Figure 7B:
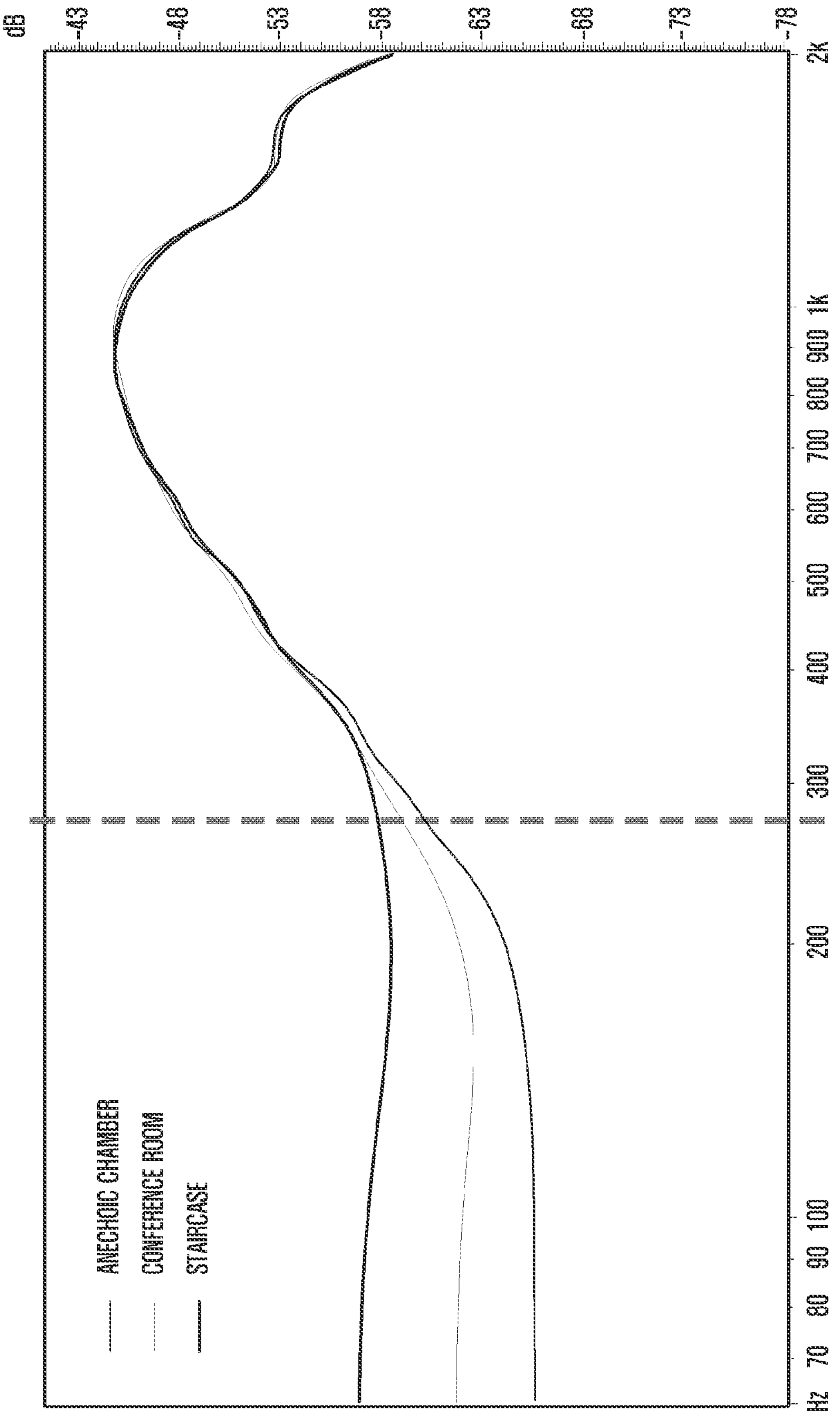

FIG. 7B illustrates an energy level for each frequency band of a signal detected by the second microphone of the electronic device when the same reference signal is output through a speaker in three different spatial environments, in a state in which a user is holding the electronic device in hand.

Figure 7C:
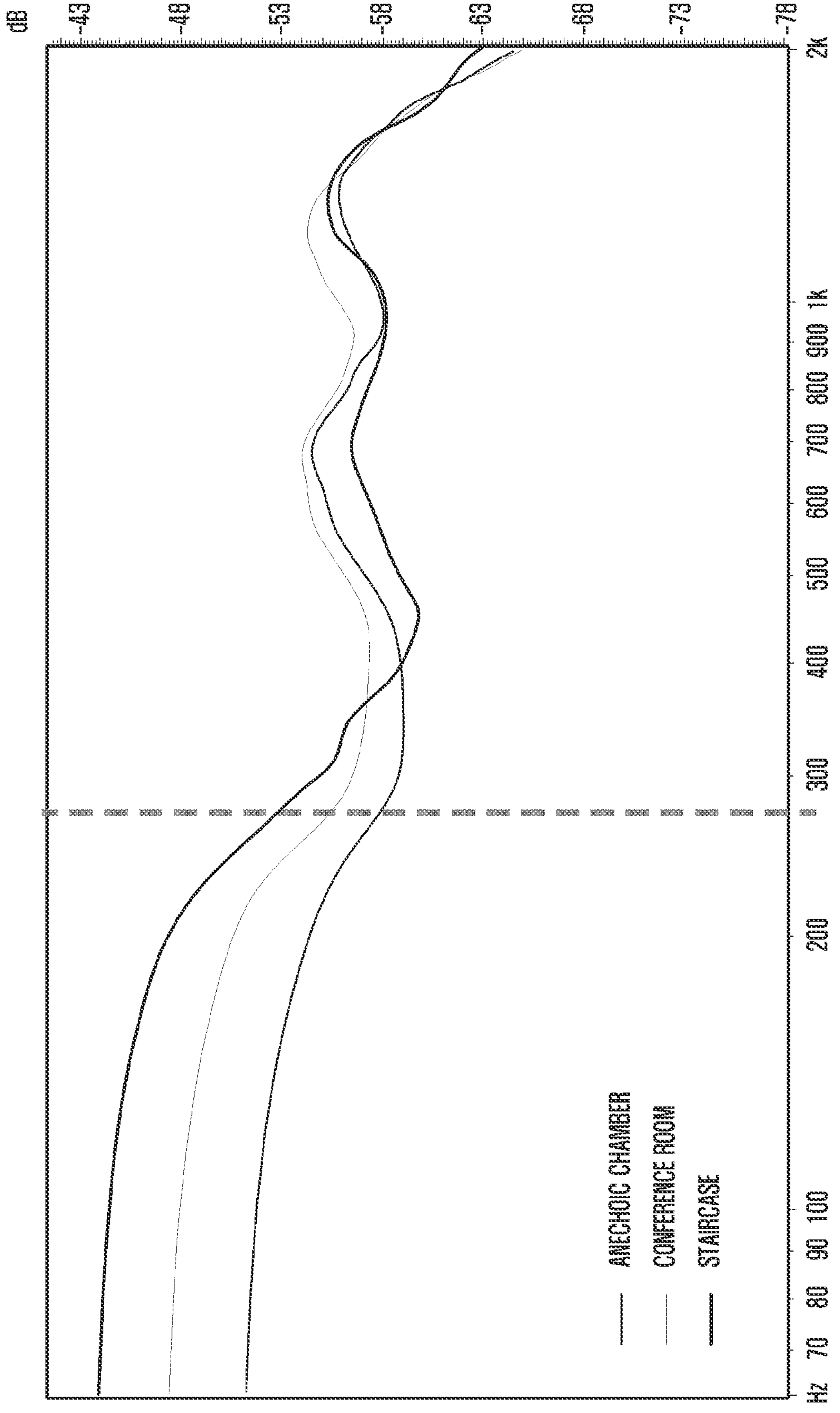

FIG. 7C illustrates an energy level for each frequency band of a signal detected by the third microphone of the electronic device when the same reference signal is output through a speaker in three different spatial environments, in a state in which a user is holding the electronic device in hand.

Figure 7D:
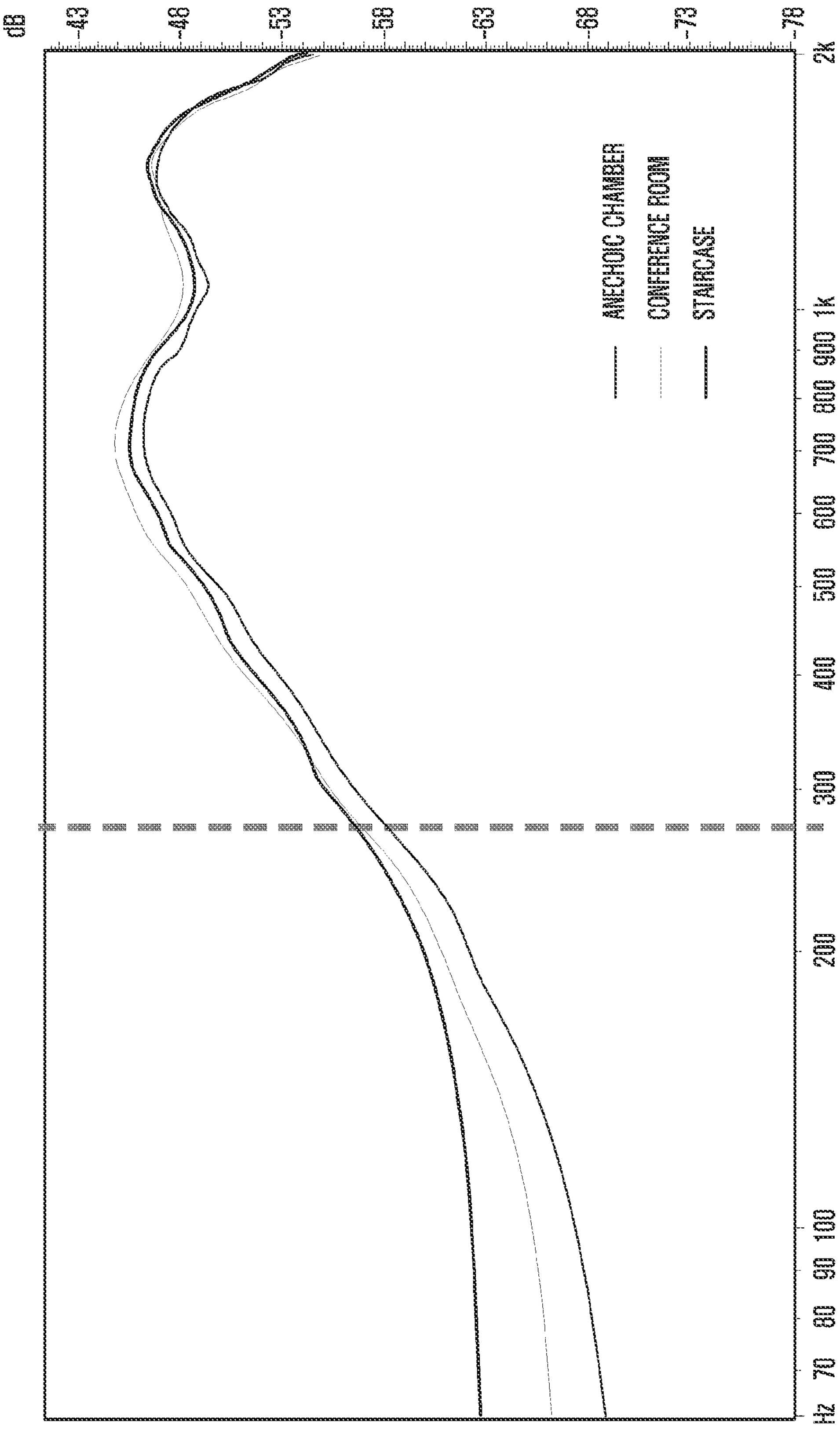

FIG. 7D illustrates an energy level for each frequency band of a signal detected by the first microphone of the electronic device when the same reference signal is output through a speaker in three different spatial environments, in a state in which a user is placing the electronic device on the floor.

Figure 7E:
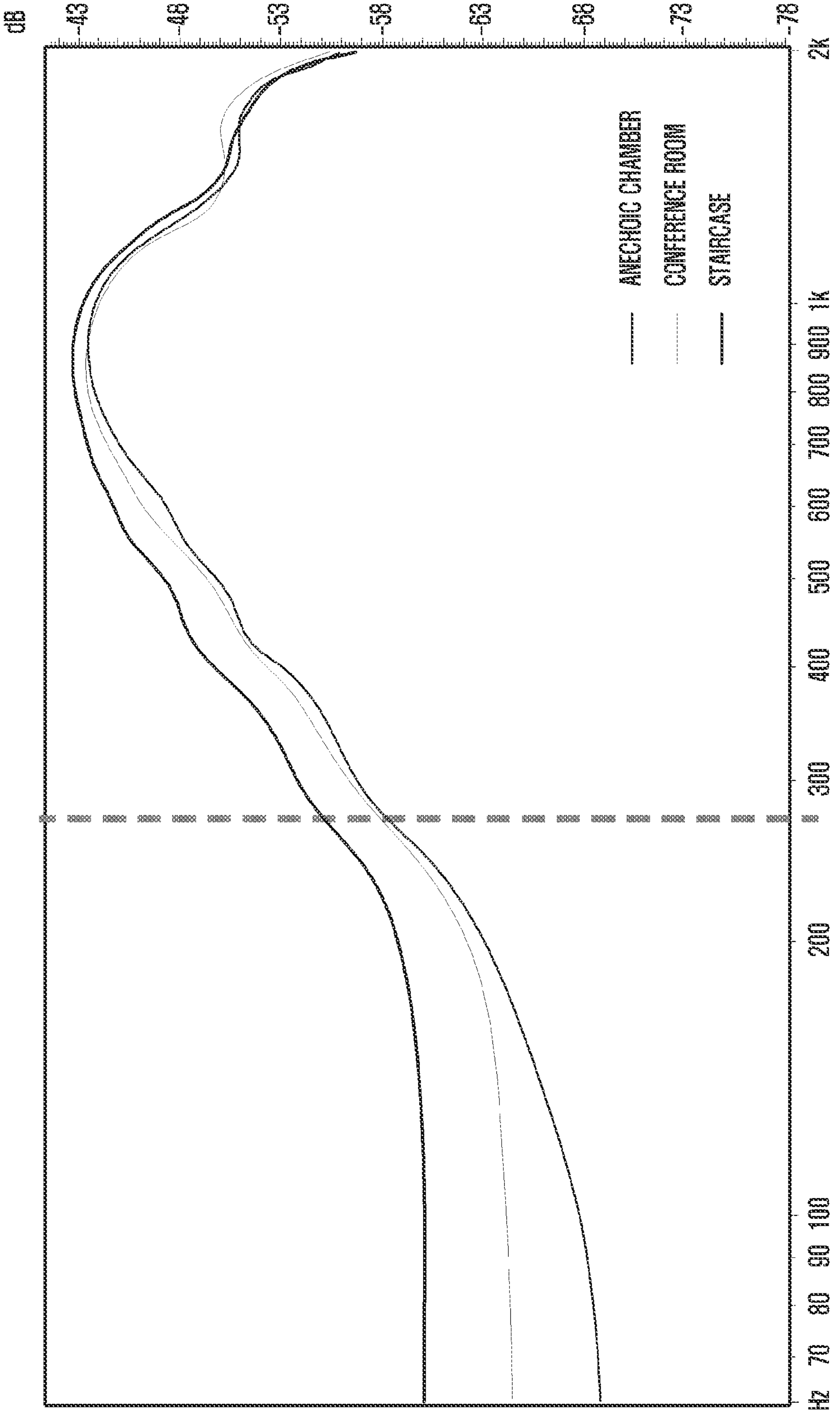

FIG. 7E illustrates an energy level for each frequency band of a signal detected by the second microphone of the electronic device when the same reference signal is output through a speaker in three different spatial environments, in a state in which a user is placing the electronic device on the floor.

Figure 7F:
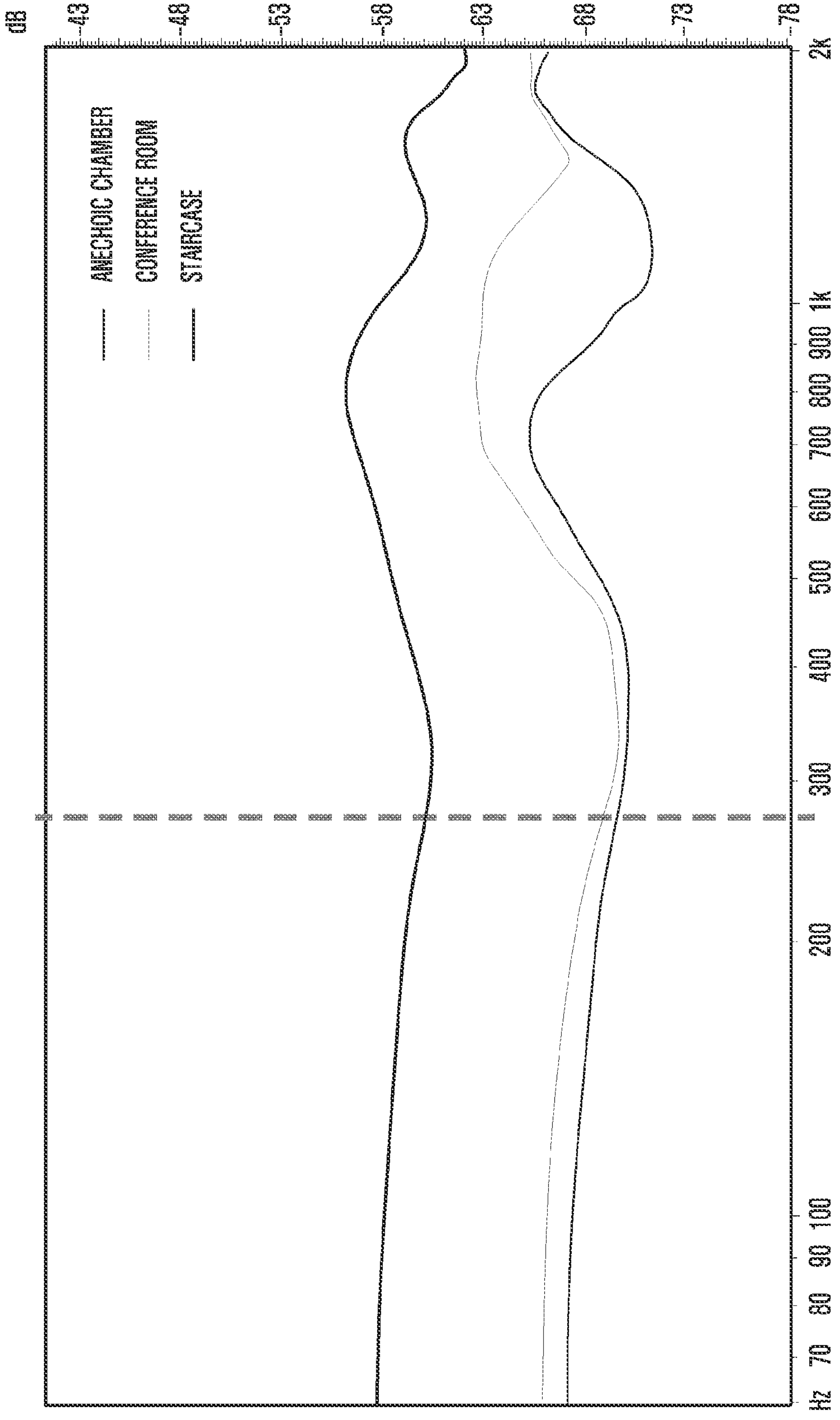

FIG. 7F illustrates an energy level for each frequency band of a signal detected by the third microphone of the electronic device when the same reference signal is output through a speaker in three different spatial environments, in a state in which a user is placing the electronic device on the floor.

Referring to FIGS. 7A to 7F, it is noted that in a low frequency band of the reference frequency of 250 Hz or below, an energy level of a sound signal collected in each space has a predetermined pattern. That is, in a low frequency band of each graph, an energy level of the signal measured in the anechoic chamber is the lowest, an energy level of the staircase is the highest, and in the conference room, a medium energy level between the anechoic chamber and the staircase may be measured. In addition, as noted from each graph, in a frequency band higher than the reference frequency of 250 Hz, a difference of energy levels of the signals measured in the anechoic chamber, the conference room, and the staircase may be irregular without a predetermined pattern.

Compared with FIG. 7A, which illustrates a signal of a first microphone while a user is holding the electronic device, and FIG. 7D, which illustrates a signal of a first microphone while a user is placing the electronic device on the floor, a difference of energy levels in each frequency band may be considered relatively low. Compared with FIGS. 7B and 7E, it is noted that a difference of energy levels of a signal measured by a second microphone is also relatively low but relatively larger than that of the first microphone. On the other hand, compared with FIG. 7C, which illustrates a signal of a third microphone while a user is holding the electronic device, and FIG. 7F, which illustrates a signal of the third microphone while a user is placing the electronic device on the floor, it is noted that the difference of energy levels in each frequency band is relatively large. This may be seen as the fact that the third microphone is disposed on the back of the electronic device, and when the electronic device is mounted on the floor, the opening of the third microphone is blocked by the floor, thereby reducing the magnitude of the input sound.

According to an embodiment, the electronic device may determine a spatial state and/or use state of the electronic device based on an energy level in a low frequency band that is equal to or lower than a reference frequency (e.g., 250 Hz) of the signal detected by each microphone and an average energy level (or RMS average level) of all frequency bands. For example, the electronic device may determine an environment in which the larger the energy level of a low frequency band and the average energy level of all frequency bands, the greater the echoes.

According to an embodiment, when outputting a reference signal through the speakers and analyzing the magnitude of an echo signal detected by each microphone, it is noted to have a predetermined delta value. Here, the delta value may refer to a difference between the magnitude of the reference signal and the magnitude of the echo signal.

Table 3 below illustrates a delta value, which is the difference between energy levels of all frequency bands of signals measured by the first microphone, the second microphone, and the third microphone, and energy levels of all frequency bands of a signal output through the speaker, at each location while the user is holding the electronic device. In Table 3 and Table 4 below, “default” is an environment in which there is no impact of echo, and the echo impact may be greater in order of following environments: listening room-phone booth-office-conference room-staircase-hallway.

TABLE 3

| | Default | Listening room | Phone booth | Office | Conference room | Staircase | Hallway |
|---|---|---|---|---|---|---|---|
| MIC 1 | −21.81 | −21.75 | −21.20 | −20.98 | −20.90 | −20.63 | −20.22 |
| MIC 2 | −23.50 | −23.48 | −23.30 | −23.20 | −23.01 | −22.96 | −21.56 |
| MIC 3 | −29.36 | −28.84 | −27.93 | −27.87 | −27.26 | −26.34 | −25.44 |

In Table 3 above, an average of delta values measured by the first microphone may be −21.07 dB, the maximum value (e.g., hallway) may be −20.22 dB, and the minimum value (e.g., Default) may be −21.81 dB. The average of delta values measured by the second microphone may be −23.00 dB, the maximum value may be −21.56 dB, and the minimum value may be −23.50 dB. The average of delta values measured by the third microphone may be −27.58 dB, the maximum value may be −25.44 dB, and the minimum value may be −29.36 dB.

Table 4 below illustrates a delta value, which is the difference between energy levels of all frequency bands of signals measured by the first microphone, the second microphone, and the third microphone, and energy levels of all frequency bands of a signal output through the speaker, at each location while the user is placing the electronic device on the floor.

TABLE 4

| | Default | Listening room | Phone booth | Office | Conference room | Staircase | Hallway |
|---|---|---|---|---|---|---|---|
| MIC 1 | −18.97 | −18.75 | −18.74 | −18.69 | −18.58 | −18.30 | −18.27 |
| MIC 2 | −19.43 | −19.39 | −19.37 | −19.01 | −18.96 | −18.75 | −18.28 |
| MIC 3 | −23.77 | −22.25 | −22.11 | −19.32 | −19.28 | −17.02 | −16.97 |

In Table 4 above, an average of delta values measured by the first microphone may be −18.61 dB, the maximum value (e.g., hallway) may be −18.27 dB, and the minimum value (e.g., Default) may be −18.97 dB. The average of delta values measured by the second microphone may be −19.03 dB, the maximum value may be −18.28 dB, and the minimum value may be −19.43 dB. The average of delta values measured by the third microphone may be −20.10 dB, the maximum value may be −16.97 dB, and the minimum value may be −23.77 dB.

Referring to Table 3 and Table 4 above, the average of the delta values measured by the first microphone is −21.07 dB and −18.61 dB in the holding state and the floor-mounted state, respectively, the average of the delta values measured by the second microphone is −23.00 dB and −19.03 dB in the holding state and the floor-mounted state, respectively, and the average of delta values measured by the third microphone is −27.58 dB and −20.10 dB in the holding state and the floor-mounted state, respectively. In other words, since the first microphone is disposed farther from the speaker than in a case of the second microphone and the third microphone, it is noted that the difference between a delta value indicating the difference between the average energy level of the reference signal and the average energy level of the echo signal in the holding state and a delta value indicating the difference between the average energy level of the reference signal and the average energy level of the echo signal in the floor-mounted state is smaller.

According to an embodiment, the electronic device may store, in memory, a correction table in which a delta value is mapped to each microphone in each space. When a call is initiated in a speaker phone mode during a call connection with an external electronic device, the electronic device may output a reference signal transmitted from the external electronic device through the speaker, and may acquire an echo signal obtained by each microphone. The electronic device may calculate a delta value, which is the difference between the average energy levels of all frequency bands of the acquired each echo signal and the existing signal, respectively, may identify a delta value mapped to the calculated delta value, from the correction table stored in the memory, and may determine the current spatial state and use state of the electronic device from the data identified in the correction table.

According to an embodiment, the electronic device may determine spatial information in which the electronic device is currently located, based on an energy level of the reference frequency band of the echo signal acquired from a specific microphone, and may identify, from the table, a value most similar to a delta value mapped to the determined spatial information so as to determine the use state of the electronic device (e.g., holding state or mounting state).

According to an embodiment, the electronic device may detect movement of the electronic device, using at least one sensor (e.g., an acceleration sensor, a gyro sensor) that may detect the movement of the electronic device in a sensor module (e.g., the sensor module of FIG. 3), and may determine the use state of the electronic device further based on the detected movement. For example, in case that a use state corresponding to a delta value in a correction table that corresponds to the calculated delta value indicates the floor-mounted state, and there is no change in sensor data, the electronic device may determine that the electronic device is currently being mounted on the floor.

Figure 8A:
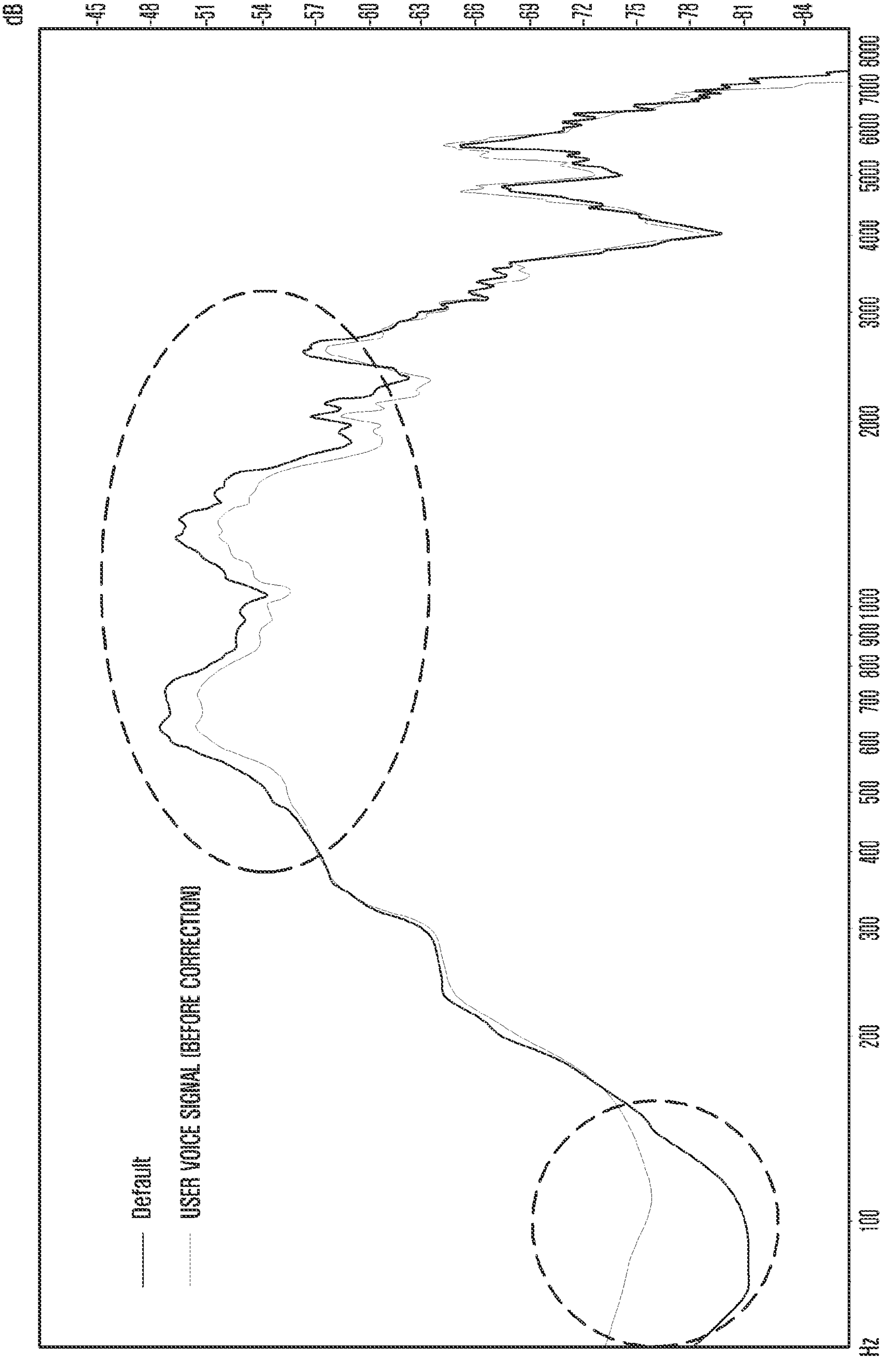
FIGS. 8A, 8B and 8C are graphs illustrating an example in which an electronic device processes a user voice signal according to various embodiments.
Figure 8B:
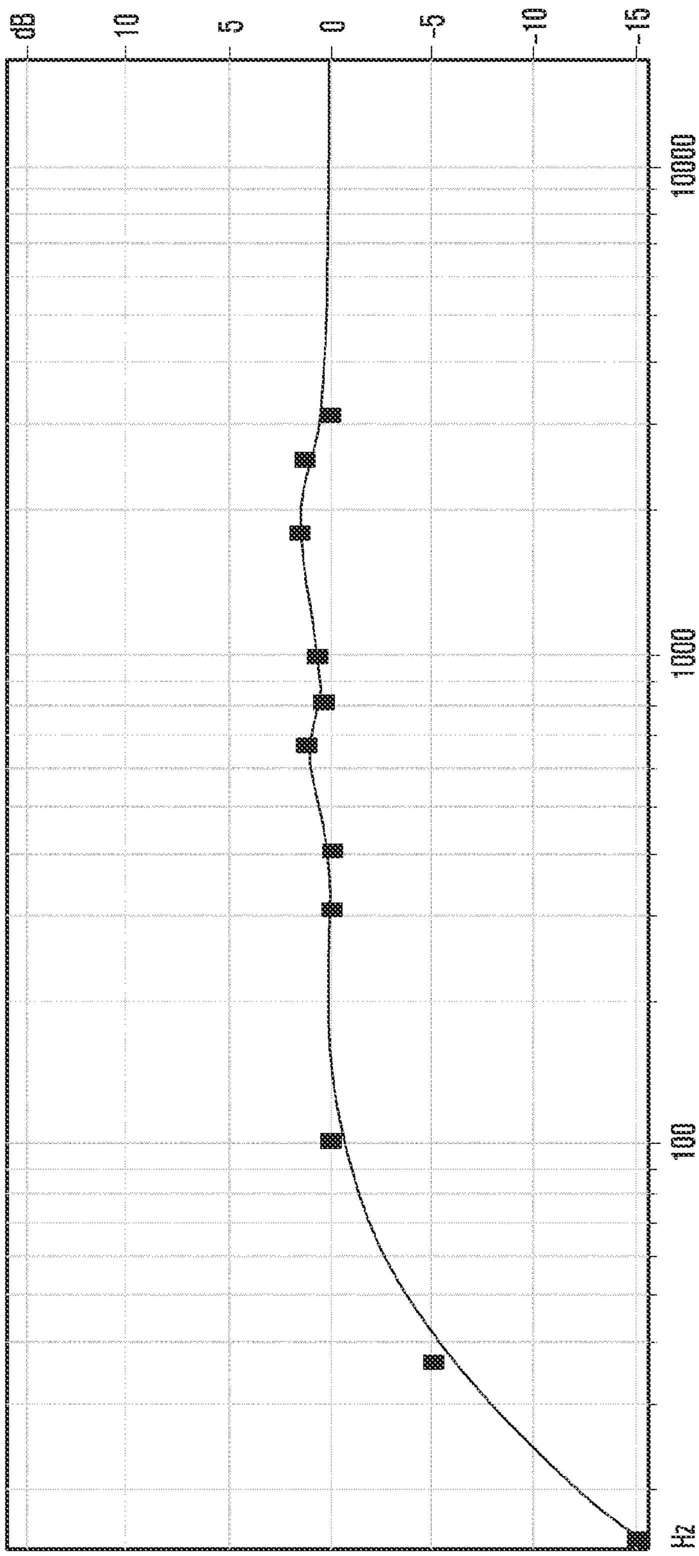
Figure 8C:
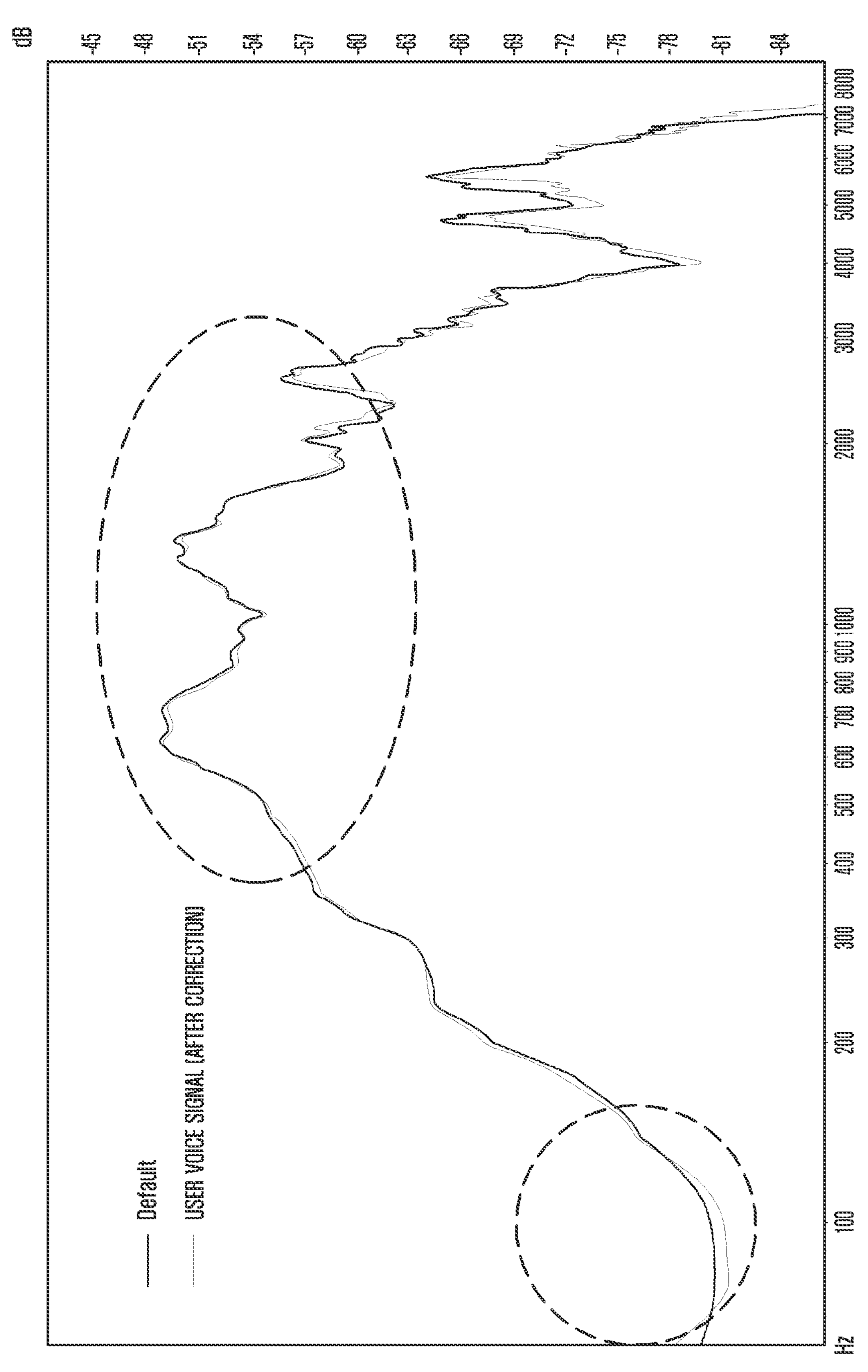

FIGS. 8A, 8B and 8C are graphs illustrating examples in which an electronic device processes a user voice signal according to various embodiments.

FIG. 8A is a graph illustrating an energy level for each frequency band of a pre-stored default signal and a user voice signal (or a second sound signal) which is acquired by one microphone among at least one microphone (e.g., the microphone 320 of FIG. 3) of an electronic device (e.g., the electronic device 300 of FIG. 3).

According to an embodiment, the electronic device may pre-store the characteristics of the user voice signal in a memory (e.g., the memory 360 in FIG. 3). For example, when the electronic device acquires the user's voice through a microphone in an anechoic chamber condition, the electronic device may pre-store information of an energy level for each frequency band and an average energy level in all frequency bands.

Referring to FIG. 8A, compared with an actual acquired user voice signal and a default signal, it is noted that in a low frequency band equal to or lower than a reference frequency (e.g., 250 Hz), an energy level of a user voice signal is greater about 3 dB to 15 dB than an energy level of a default signal, and that in a frequency band higher than the reference frequency, there is some difference between the energy levels of the user voice signal and the default signal.

According to an embodiment, the electronic device may determine parameters to be used in processing a user voice signal (or the first sound signal) input to the microphone when the user utters speech, based on a comparison of a reference signal (or the first sound signal) obtained from the external electronic device during a call and an echo signal (or the second sound signal) obtained by the microphone when the reference signal is output through the speaker. For example, the electronic device may determine spatial information corresponding to a space in which the electronic device is located (e.g., an anechoic chamber, an office, a staircase) based on a comparison of the energy levels of the reference signal and the echo signal in a low frequency band equal to or lower than the reference frequency, and may determine use state information of the electronic device (e.g., holding in hand, mounting on the floor) based on a comparison of the average energy levels of all frequency bands. The electronic device may identify parameters (e.g., a filter value, an amplifier gain) mapped to the determined spatial information and use state information from a correction table pre-stored in a memory, and may process the user voice signal using the identified parameters.

FIG. 8B is a graph illustrating filter values determined based on a comparison of the reference signal and echo signal, as described above.

Referring to FIG. 8B, a filter value to be used for the user voice signal in each frequency band may be up to −15 dB, and in a band higher than the reference frequency, the filter value may indicate a smaller value. Referring to FIG. 8A, in a low frequency band equal to or lower than the reference frequency, where a difference between the user voice signal and the default signal is large, the difference between the actual acquired user voice signal and the default signal is large. Further, in a band higher than the reference frequency, the difference between the actual acquired user voice signal and the default signal is small, a filter value determined as shown in FIG. 8B may correspond to the difference between the actual acquired user voice signal and the default signal.

According to an embodiment, the electronic device may filter the user voice signal by applying a filter value identified in the correction table (e.g., the filter value of FIG. 8B) to a filter (e.g., the Tx filter of FIG. 5). Further, the electronic device may amplify the user voice signal by applying a gain identified in the correction table to an amplifier (e.g., the Tx amplifier of FIG. 5).

FIG. 8C is a graph illustrating an energy level for each frequency band of a user voice signal and a default signal after the actual acquired user voice signal of FIG. 8A is corrected based on the parameter of FIG. 8B.

Compared with the graph of FIG. 8A, the graph of FIG. 8C may represent that a user voice signal is corrected and thus a difference between the energy levels of the corrected user voice signal and the default signal is reduced in each frequency band. Accordingly, even when the electronic device is in various environments (e.g., spatial environment, use state), a user voice can be transmitted to an external electronic device as accurately as if it were spoken in an anechoic chamber.

Figure 9:
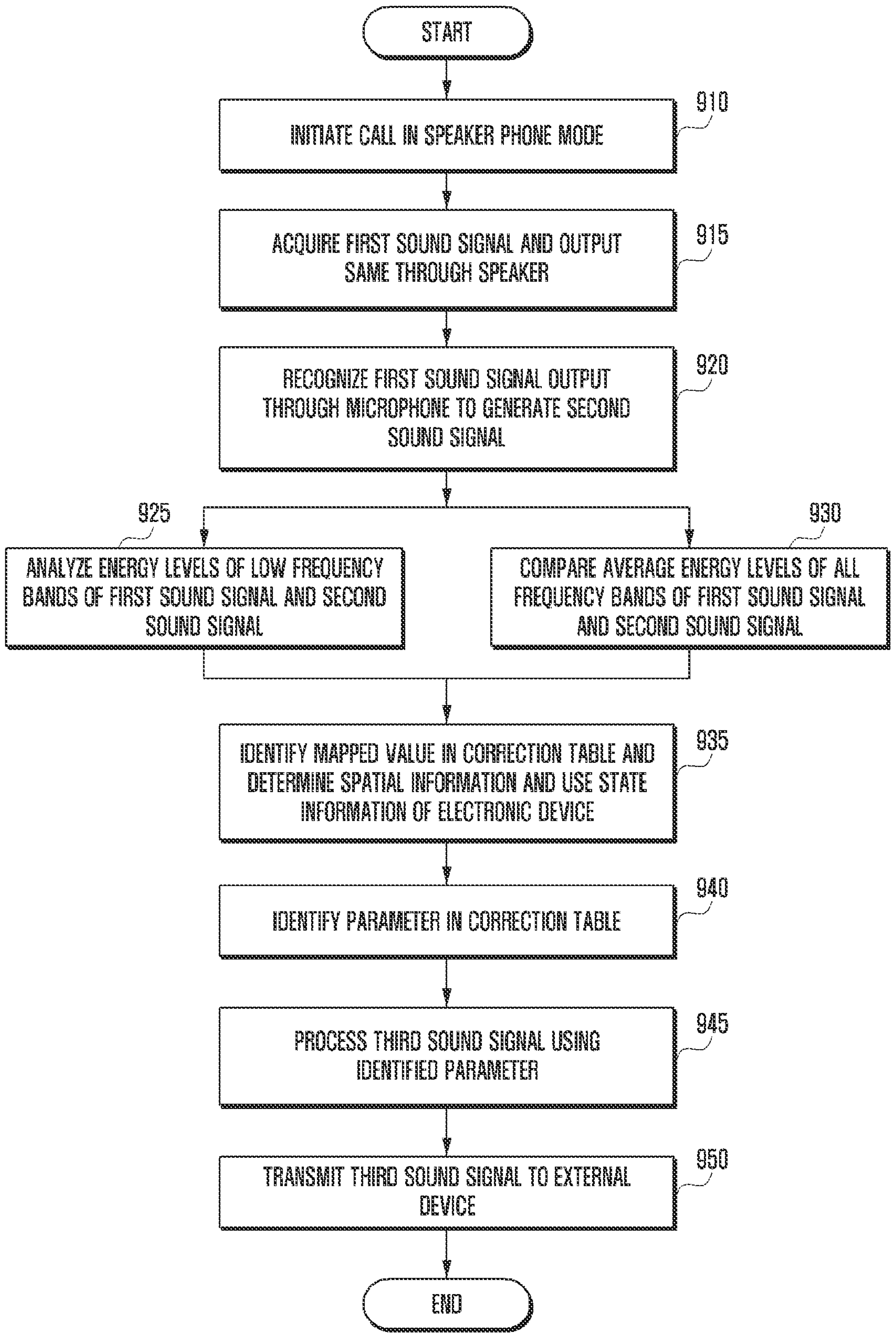
FIG. 9 is a flowchart illustrating an example microphone signal correction method of an electronic device according to various embodiments.

FIG. 9 is a flowchart illustrating an example microphone signal correction method of an electronic device according to various embodiments.

The illustrated method may be performed by an electronic device described in FIGS. 1 to 8C (e.g., the electronic device 300 of FIG. 3). Technical features that have been previously described may be omitted from the following description.

According to an embodiment, in operation 910, the electronic device may establish or initiate a call connection with an external electronic device. The electronic device may operate in a speaker phone mode in response to user input, and in the speaker mode, may output sound signals transmitted by the external electronic device through a speaker.

According to an embodiment, in operation 915, the electronic device may receive or acquire a first sound signal transmitted from the external electronic device through a network, and output the first sound signal through the speaker.

According to an embodiment, in operation 920, the electronic device may recognize the first sound signal, which is output through the speaker, via a microphone to generate a second sound signal (or an echo signal). For example, in case that the electronic device outputs the first sound signal received from an external electronic device through a speaker, an echo phenomenon may occur in which the output sound is input to the microphone and transmitted back to the external electronic device. According to an embodiment, the electronic device may generate a second sound signal based on sound recognized through the microphone while the user is not speaking.

According to an embodiment, in operation 925, the electronic device may analyze an energy level in a low frequency band equal to or lower than a reference frequency of the first sound signal and an energy level in a low frequency band equal to or lower than a reference frequency of the second sound signal. Here, the reference frequency may be, but is not limited to, 250 Hz. As previously described with reference to FIG. 6, a sound signal acquired by the microphone may have different characteristics depending on the characteristics of a space in which the electronic device is located, and the pattern may be clearly visible in the low frequency band. Accordingly, the electronic device may analyze energy levels in a low frequency band equal to or lower than the reference frequency of the first sound signal and the second sound signal, and may determine the spatial information of the electronic device based thereon.

According to an embodiment, in operation 930, the electronic device may compare an average energy level of all frequency bands of the first sound signal and an average energy level of all frequency bands of the second sound signal. Here, the average energy level may be a root mean square (RMS) average level.

According to an embodiment, in operation 935, the electronic device may identify, from a correction table pre-stored in the memory, spatial information and use state information of the electronic device corresponding to the difference between the average energy level of all frequency bands of the first sound signal and the average energy level of all frequency bands of the second sound signal. Here, the spatial information may include various spaces with different echo characteristics, such as a listening room, a staircase, a hallway, and an office, and the use state information may include a case in which the electronic device is held by a user in hand and a case in which the electronic device is mounted on the floor. According to an embodiment, the electronic device may store a correction table in which an energy level of a signal is mapped to spatial information and/or use state information. For example, the correction table may map and store, for each microphone, a delta value corresponding to the difference between an average energy level of all frequency bands of the first sound signal and an average energy level of all frequency bands of a second sound signal, in a state in which respective spatial information and use state information have been applied. The delta value stored in the correction table may be determined in advance based on the results of experiments in different spatial environments. According to an embodiment, the electronic device may include a plurality of microphones, and since the characteristics of each microphone may be different, a correction table corresponding to each microphone may be stored.

According to an embodiment, in operation 940, the electronic device may identify parameters mapped to the spatial information and use state information identified in the correction table. The correction table stored in the memory of the electronic device may include parameters mapped to the respective spatial information and use state information. Here, the parameters may include various parameters used in processing a third sound signal (or user voice signal), for example, a filter value to be applied to a filter that filters the third sound signal and/or a gain to be applied to an amplifier that amplifies the third sound signal. By performing operation 935 and operation 940, the electronic device may obtain a parameter that is highly correlated with the current spatial information and use state information.

According to an embodiment, in operation 945, the electronic device may process, using the identified parameters, the third sound signal including a user's voice obtained by a microphone.

According to an embodiment, in operation 950, the electronic device may transmit the processed third sound signal to an external electronic device through the network.

According to an embodiment, the electronic device may include at least one microphone (e.g., first microphone 322, second microphone 324, third microphone 326 of FIG. 4), and operation 915 and below of FIG. 9 may each be performed on a sound signal acquired from each of the microphones. For example, the electronic device may acquire a first sound signal from the first microphone (operation 915), generate a second sound based on the first sound signal of the first microphone (operation 920), and process a third sound signal (operation 945), and at least partially simultaneously with the operations, may acquire a first sound signal from the second microphone (operation 915), generate a second sound based on the first sound signal of the second microphone (operation 920), and process a third sound signal (operation 945). According to an embodiment, at least some of operations 915 and below performed on the sound signals obtained from each microphone may be performed at least partially simultaneously.

An electronic device according to various example embodiments of the disclosure may include a communication module, comprising communication circuitry, configured to perform wireless communication with a network, at least one microphone configured to collect a sound signal, at least one speaker configured to output the sound signal, and at least one processor, comprising processing circuitry, operatively connected to the at least one microphone and the at least one speaker.

According to an example embodiment, at least one processor, individually and/or collectively, may be configured to: perform a call connection with an external electronic device through a network using the communication module, process a first sound signal corresponding to a sound signal input from the external electronic device and received through the network, and output the processed first sound signal through the at least one speaker, detect the first sound signal output through the at least one speaker, through the microphone to generate a second sound signal.

According to an example embodiment, at least one processor, individually and/or collectively, may be configured to: compare an energy level of a frequency band equal to or below a reference frequency in the first sound signal with an energy level of a frequency band equal to or below the reference frequency in the second sound signal, and based on a result of the comparison, determine spatial information corresponding to a space in which the electronic device is located.

According to an example embodiment, at least one processor, individually and/or collectively, may be configured to determine, based on the determined spatial information, at least one parameter for processing a third sound signal corresponding to a user's voice input through the microphone.

According to an example embodiment, at least one processor, individually and/or collectively, may be configured to: identify a difference between an average energy level of all frequency bands of the first sound signal and an average energy level of all frequency bands of the second sound signal, determine use state information of the electronic device based on the identified difference, and determine a parameter for processing the third sound signal further based on the determined use state information.

According to an example embodiment, the use state information of the electronic device may include a state in which the electronic device is held or a state in which the electronic device is mounted on the floor.

According to an example embodiment, the electronic device may further include a sensor module including at least one sensor configured to detect movement of the electronic device, and at least one processor, individually and/or collectively, may be configured to determine the use state information further based on sensor data obtained from the sensor module.

According to an example embodiment, the memory may store a correction table in which the energy level of the frequency band equal to or below the reference frequency in the first sound signal and the difference between the average energy level of all frequency bands of the first sound signal and the average energy level of all frequency bands of the second sound signal are mapped to the space information and the use state information.

According to an example embodiment, the correction table may further include the parameter mapped to the space information and the use state information.

According to an example embodiment, the at least one parameter may include a filter value applied to a filter that filters the voice signal and a gain applied to an amplifier that amplifies the third sound signal.

According to an example embodiment, at least one processor, individually and/or collectively, may be configured to determine parameters corresponding to the at least one microphone, respectively, by comparing a sound signal input from each of the at least one microphone with the first sound signal.

According to an example embodiment, at least one processor, individually and/or collectively, may be configured to: cancel an echo component of the third sound signal based on the first sound signal, and process the third sound signal from which the echo component has been cancelled, using the determined at least one parameter.

According to an example embodiment, at least one processor, individually and/or collectively, may, based on a difference between the energy level of all frequency bands of the third sound signal, having been processed by applying the parameter, and the energy level of all frequency bands of a pre-stored default signal having a value greater than a reference value, be configured to determine that an error has occurred in the microphone.

According to an example embodiment, at least one processor, individually and/or collectively, may be configured to, in at least one speaker phone call mode: detect a first sound signal output through the at least one speaker, through the microphone, and generate the second sound signal.

A sound signal correction method of an electronic device according to various example embodiments of the disclosure may include: performing a call connection with an external electronic device through a network, processing a first sound signal corresponding to a sound signal input from the external electronic device and received through the network, and outputting the processed first sound signal through at least one speaker, detecting the first sound signal output through the at least one speaker through the microphone to generate a second sound signal, comparing an energy level of a frequency band equal to or below a reference frequency in the first sound signal with an energy level of a frequency band equal to or below the reference frequency in the second sound signal, determining spatial information corresponding to a space in which the electronic device is located, based on a result of the comparison, and determining at least one parameter for processing a third sound signal corresponding to a voice input through the microphone, based on the determined spatial information.

According to an example embodiment, the method may further include: identifying a difference between an average energy level of all frequency bands of the first sound signal and an average energy level of all frequency bands of the second sound signal, and determining use state information of the electronic device based on the identified difference, wherein the determining of the at least one parameter may include determining a parameter for processing the third sound signal, further based on the determined use state information.

According to an example embodiment, the use state information of the electronic device may include a state in which the electronic device is held or a state in which the electronic device is mounted on the floor.

According to an example embodiment, the determining of the use state information may include determining the use state information further based on sensor data obtained from a sensor module configured to detect movement of the electronic device.

According to an example embodiment, the electronic device may store a correction table in which the energy level of the frequency band equal to or lower than the reference frequency in the first sound signal, and the difference between the average energy level of all frequency bands of the first sound signal and the average energy level of all frequency bands of the second sound signal are mapped to the spatial information and the use state information.

According to an example embodiment, the correction table may further include the parameter mapped to the spatial information and the use state information.

According to an example embodiment, the at least one parameter may include a filter value applied to a filter that filters the third sound signal and a gain applied to an amplifier that amplifies the voice signal.

According to an example embodiment, the method may further include: cancelling an echo component of the third sound signal based on the first sound signal, and processing the third sound signal from which the echo component has been cancelled, using the determined at least one parameter.

According to an example embodiment, the method may further include, based on a difference between an energy level of all frequency bands of the third sound signal, having been processed by applying the parameter, and an energy level of all frequency bands of a pre-stored default signal having a value greater than a reference value: determining that an error has occurred in the microphone.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a communication module, comprising communication circuitry;

at least one microphone;

at least one speaker;

memory storing instructions;

at least one processor operatively connected to the at least one microphone and the at least one speaker, wherein the instructions, when executed by the at least one processor, cause the electronic device to:

perform a call connection with an external electronic device through a network using the communication module;

receive a first sound signal from the external electronic device through the network;

process the first sound signal to generate a processed first sound signal output the processed first sound signal through the at least one speaker;

receive, through the at least one microphone, a second sound signal corresponding to an echo signal resulting from the processed first sound signal output through the at least one speaker;

identify at least one parameter for adjusting a user's voice signal received through the at least one microphone, corresponding to a space in which the electronic device is located, based on a comparison of energy levels of the processed first sound signal and the second sound signal in a frequency band at or below a reference frequency;

receive a third sound signal through the at least one microphone, wherein the third sound signal includes the second sound signal and the user's voice signal;

suppress an echo component from the third sound signal based on the processed first sound signal; and adjust the user's voice signal, after the echo component is suppressed, based on the identified at least one parameter.

2. The electronic device of claim 1, wherein the instructions, when executed by the at least one processor, further cause the electronic device to:

identify a difference between an average energy level of all frequency bands of the processed first sound signal and an average energy level of all frequency bands of the second sound signal;

based on the identified difference, determine use state information of the electronic device; and identify at least one parameter further based on the determined use state information.

3. The electronic device of claim 2, wherein the use state information of the electronic device comprises a state in which the electronic device is held or a state in which the electronic device is mounted on a surface.

4. The electronic device of claim 2, further comprising a sensor module including at least one sensor configured to detect movement of the electronic device, wherein the instructions, when executed by the at least one processor, further cause the electronic device to determine the use state information based on sensor data obtained from the sensor module.

5. The electronic device of claim 1, wherein the memory stores a correction table in which a delta value corresponding to a difference between an energy level of all frequency bands of the processed first sound signal and an average energy level of all frequency bands of the second sound signal is mapped to the space and use state information, for each of the at least one microphone.

6. The electronic device of claim 5, wherein the correction table further comprises the at least one parameter mapped to the space and the use state information.

7. The electronic device of claim 1, wherein the at least one parameter comprises a filter information applied to a filter configured to filter the user's voice signal and a gain information applied to an amplifier that amplifies the user's voice signal.

8. The electronic device of claim 1, wherein the instructions, when executed by the at least one processor, further cause the electronic device to identify the at least one parameters corresponding to each of the at least one microphone, respectively, by comparing a sound signal received from each of the at least one microphone with the processed first sound signal.

9. The electronic device of claim 1, wherein the reference frequency is 250 Hz.

10. The electronic device of one claim 1, wherein the instructions, when executed by the at least one processor, further cause the electronic device to, based on a difference between an energy level of all frequency bands of the user's voice signal, having been adjusted by applying the at least one parameter, and an energy level of all frequency bands of a pre-stored default signal having a value greater than a reference value, determine that an error has occurred in the at least one microphone.

11. The electronic device of claim 1, wherein the instructions, when executed by the at least one processor, further cause the electronic device to, in a speaker phone call mode, receive the second sound signal through the at least one microphone.

12. A method for adjusting a sound signal of an electronic device, the method comprising:

performing a call connection with an external electronic device through a network;

receiving a first sound signal from the external electronic device through the network;

processing the first sound signal to generate a processed first sound signal outputting the processed first sound signal through at least one speaker;

receiving, through at least microphone, a second sound signal corresponding to an echo signal resulting from the processed first sound signal, output through the at least one speaker;

identifying at least one parameter for adjusting a user's voice signal received through the at least one microphone, corresponding to a space in which the electronic device is located, based on a comparison of energy levels of the processed first sound signal and the second sound signal in a frequency band at or below a reference frequency;

receiving a third sound signal through the at least one microphone, wherein the third sound signal includes the second sound signal and the user's voice signal;

suppressing an echo component from the third sound signal based on the processed first sound signal; and adjusting the user's voice signal, after the echo component is suppressed, based on the identified at least one parameter.

13. The method of claim 12, further comprising:

identifying a difference between an average energy level of all frequency bands of the processed first sound signal and an average energy level of all frequency bands of the second sound signal; and based on the identified difference, determining use state information of the electronic device, wherein the identifying of the at least one parameter is further based on the determined use state information.

14. The method of claim 13, wherein the use state information of the electronic device comprises a state in which the electronic device is held or a state in which the electronic device is mounted on a surface.

15. The method of claim 13, wherein the determining of the use state information further comprises determining the use state information obtained from a sensor module configured to detect movement of the electronic device.

16. The method of claim 12, further comprising storing, in a memory, a correction table in which a delta value corresponding to a difference between an average energy level of all frequency bands of the processed first sound signal and an average energy level of all frequency bands of the second sound signal is mapped to the space and use state information, for each of the at least one microphone.

17. The method of claim 16, wherein the correction table further comprises the at least one parameter mapped to the space and the use state information.

18. The method of claim 12, wherein the at least one parameter comprises a filter information applied to a filter configured to filter the user's voice signal and a gain information applied to an amplifier that amplifies the user's voice signal.

19. The method of claim 12, wherein the reference frequency is 250 Hz.

20. The method of claim 12, further comprising, based on a difference between an energy level of all frequency bands of the user's voice signal, having been adjusted by applying the parameter, and an energy level of all frequency bands of a pre-stored default signal having a value greater than a reference value, determining that an error has occurred in the at least one microphone.

* * * * *